(12) United States Patent
Suzuki et al.

(10) Patent No.: US 9,235,263 B2
(45) Date of Patent: Jan. 12, 2016

(54) INFORMATION PROCESSING DEVICE, DETERMINATION METHOD, AND NON-TRANSITORY COMPUTER READABLE STORAGE MEDIUM

(71) Applicant: YAHOO JAPAN CORPORATION, Tokyo (JP)

(72) Inventors: Mariko Suzuki, Tokyo (JP); Ayaka Hirano, Tokyo (JP); Chika Watanabe, Tokyo (JP); Yuichi Kitajima, Tokyo (JP); Hiroki Sasakido, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 67 days.

(21) Appl. No.: 14/020,048

(22) Filed: Sep. 6, 2013

(65) Prior Publication Data
US 2015/0061824 A1 Mar. 5, 2015

(30) Foreign Application Priority Data
Aug. 28, 2013 (JP) ................ 2013-177358

(51) Int. Cl.
*G06F 7/00* (2006.01)
*G06F 3/01* (2006.01)
*G06Q 50/00* (2012.01)

(52) U.S. Cl.
CPC ........... *G06F 3/013* (2013.01); *G06F 3/011* (2013.01); *G06F 3/015* (2013.01); *G06Q 50/01* (2013.01); *G06F 2203/011* (2013.01)

(58) Field of Classification Search
CPC .................................................. G06Q 50/01
See application file for complete search history.

(56) References Cited

U.S. PATENT DOCUMENTS

| | | | | |
|---|---|---|---|---|
| 7,792,761 | B2 * | 9/2010 | Murakami | G06F 17/274 705/319 |
| 8,014,763 | B2 * | 9/2011 | Hymes | 455/414.2 |
| 2007/0037574 | A1 * | 2/2007 | Libov et al. | 455/435.2 |
| 2013/0144937 | A1 * | 6/2013 | Lee | G06Q 50/01 709/203 |
| 2013/0280682 | A1 * | 10/2013 | Levine et al. | 434/236 |
| 2014/0040010 | A1 * | 2/2014 | Garcia-Martinez | G06Q 30/02 705/14.43 |
| 2014/0118225 | A1 * | 5/2014 | Jerauld | 345/8 |
| 2014/0280558 | A1 * | 9/2014 | Jakubik | G06Q 10/10 709/204 |
| 2014/0347265 | A1 * | 11/2014 | Aimone et al. | 345/156 |

FOREIGN PATENT DOCUMENTS

| | | |
|---|---|---|
| JP | 2001-160021 A | 6/2001 |
| JP | 2001-345835 A | 12/2001 |
| JP | 2008-245168 A | 10/2008 |
| JP | A-2010-500651 | 1/2010 |
| JP | 2010-061265 A | 3/2010 |
| JP | 2015-505702 A | 2/2015 |
| WO | WO 2008/021104 A2 | 2/2008 |
| WO | 2013/088307 A1 | 6/2013 |

OTHER PUBLICATIONS

Aug. 11, 2015 Office Action issued in Japanese Patent Application No. 2013-177358.

* cited by examiner

*Primary Examiner* — Steven Lim
*Assistant Examiner* — Ryan Sherwin
(74) *Attorney, Agent, or Firm* — Oliff PLC

(57) ABSTRACT

An information processing device includes a collecting unit that collects biological information of a first user and a second user. The information processing device includes a specifying unit that specifies an emotion of the first user toward the second user and an emotion of the second user toward the first user using the biological information acquired by the collecting unit. The information processing device includes a determining unit that determines whether or not to provide information on the second user to the first user based on respective emotions specified by the specifying unit.

17 Claims, 14 Drawing Sheets

| USER ID | EMOTIONAL SCORE |
|---------|-----------------|
| USER #1 | (5, 1), (5, 3)··· |
| USER #2 | (5, -4), (4, -3)··· |
| ⋮ | ⋮ |

FIG.7

| USER ID | TARGET INFORMATION | EMOTIONAL INFORMATION |
|---|---|---|
| USER #1 | USER #2 | EXCITED STATE |
| USER #1 | USER #3 | EXCITED STATE |
| USER #2 | USER #1 | NEGATIVE STATE |
| USER #2 | USER #3 | EXCITED STATE |
| USER #3 | USER #1 | RELAXED STATE |
| USER #3 | USER #2 | EXCITED STATE |
| ⋮ | ⋮ | ⋮ |

INFORMATION PROCESSING DEVICE, DETERMINATION METHOD, AND NON-TRANSITORY COMPUTER READABLE STORAGE MEDIUM

CROSS-REFERENCE TO RELATED APPLICATION

The present application claims priority to and incorporates by reference the entire contents of Japanese Patent Application No. 2013-177358 filed in Japan on Aug. 28, 2013.

BACKGROUND OF THE INVENTION

1. Field of the Invention

The present invention relates to an information processing device, a determination method, and a recording medium.

2. Description of the Related Art

In the related art, a technique of evaluating user affinity in a social networking service (SNS) or the like and associating users based on the evaluation result is known. As an example of the technique, a technique of detecting in a social network environment, a mutual relationship such as common information from a profile of a first user and a profile of a second user and providing information related to the second user to the first user based on the detected mutual relationship is known.

Patent Document 1: Japanese National Publication of International Patent Application No. 2010-500651

However, in the related art, since the information related to the second user is provided to the first user regardless of the emotion of the first user toward the second user, the first user may feel unpleased with the provided information. Moreover, in the related art, the second user may feel unpleased with the fact that the information is provided to the first user.

SUMMARY OF THE INVENTION

It is an object of the present invention to at least partially solve the problems in the conventional technology.

According to one aspect of an embodiment of the present invention, an information processing device includes a collecting unit that collects biological information of a first user and a second user. The information processing device includes a specifying unit that specifies an emotion of the first user toward the second user and an emotion of the second user toward the first user using the biological information acquired by the collecting unit. The information processing device includes a determining unit that determines whether or not to provide information on the second user to the first user based on respective emotions specified by the specifying unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a diagram for describing an example of an emotional information management table according to the embodiment;

DETAILED DESCRIPTION OF THE PREFERRED EMBODIMENTS

Figure 1:
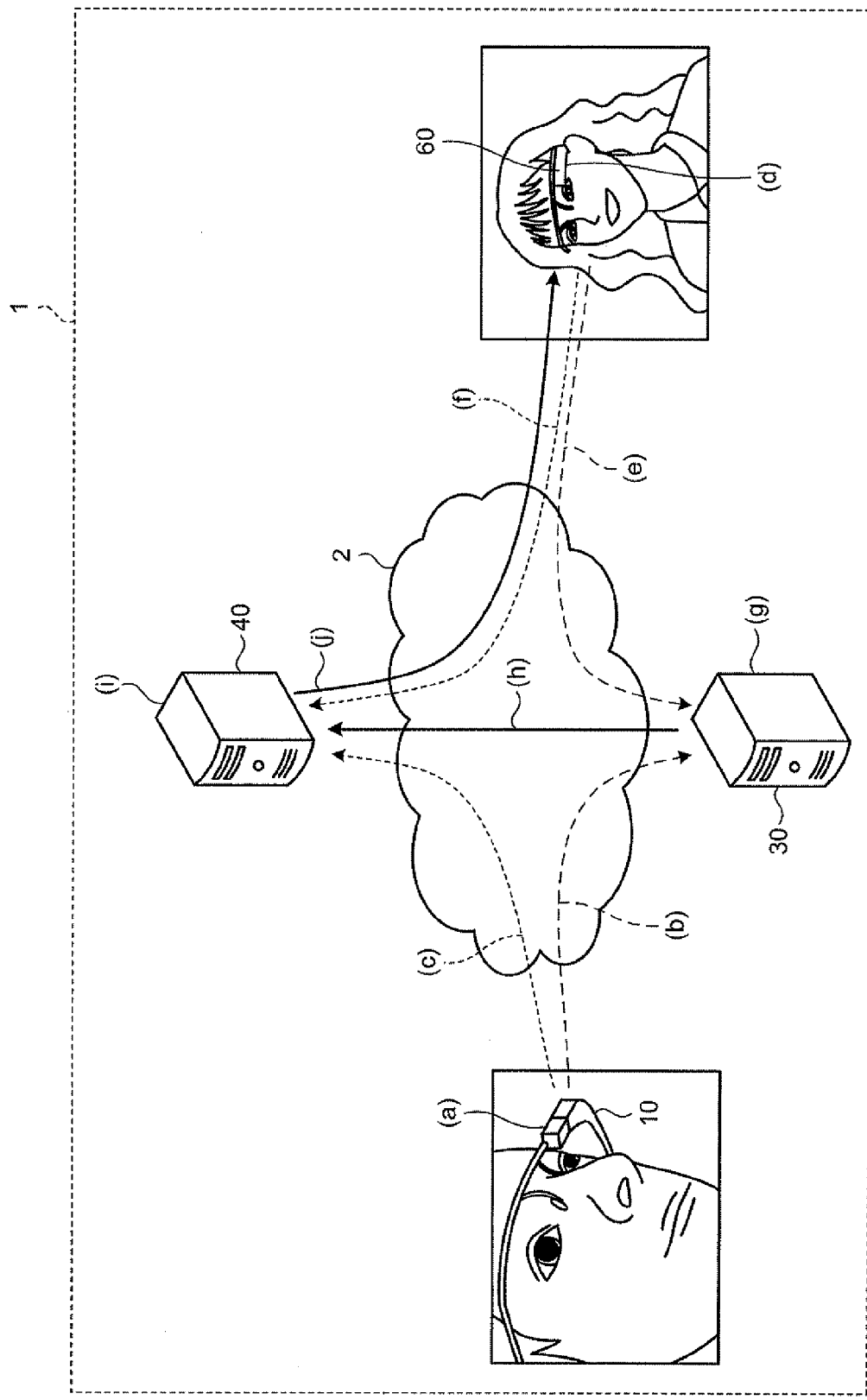
FIG. 1 is a diagram illustrating an example of the functions provided by an information providing system according to an embodiment.

Hereinafter, preferred embodiments (hereinafter referred to as "embodiments") of an information processing device, a determination method, and a recording medium according to the present application will be described in detail with reference to the drawings. The information processing device, the determination method, and the recording medium according to the present application are not limited to these embodiments. In the following embodiments, the same portions will be denoted by the same reference numerals, and redundant description thereof will not be provided.

1. Information Providing System

First, an example of the process executed by an information providing system 1 related to the information processing device, the determination method, and a determination program recorded on the recording medium according to the present application will be described with reference to FIG. 1. FIG. 1 is a diagram illustrating an example of the functions provided by the information providing system according to the embodiment. In the example illustrated in FIG. 1, the information providing system 1 has a configuration in which head mount devices 10 and 60, an emotion determining server 30, and a social network server 40 are connected via a network 2.

It is assumed that the information providing system 1 includes a plurality of head mount devices in addition to the above. It is also assumed that the head mount devices 10 and 60 are head mount devices used by different users. In the following description, an example in which the head mount device 10 is used by user #1 and the head mount device 60 is used by user #2 will be described. Moreover, in the following description, the head mount device 60 will not be described because it has the same function as the head mount device 10.

The head mount device 10 is a wearable device that acquires biological information from a user. For example, the head mount device 10 is a glasses-type device. Moreover, the head mount device 10 can display optional information within the sight of the user #1. Further, the head mount device 10 has a camera and thus can capture the scene captured within the sight of the user #1. Furthermore, the head mount device 10 captures the movements of the eyeballs of the user #1 using infrared rays or the like, for example, and thus can determine the range of the sight that the user #1 looks at (that is, the direction of the line of sight).

Further, the head mount device 10 has a biosensor provided in an arm portion that is placed on the ear and thus can acquire, from the user, various biosensor values such as a heart rate, a pulse, temperature, electromyography, electrodermal activity (EDA), voice, walk distance, and walk time of the user #1. Moreover, the head mount device 10 can connect to the network 2 via a wireless communication network such as 3G (Generation), 4G, LTE (Long Term Evolution), or GSM (Global System for Mobile Communications).

The head mount device 10 may connect to a terminal device such as a mobile phone (not illustrated) using short-range radio communication such as Bluetooth (registered trademark) or wireless LAN (Local Area Network) and may connect to the network 2 via the connected terminal device. Further, the head mount device 10 may acquire biosensor values from the user #1 with the aid of a biological information acquisition device worn on the wrist or the like of the user #1 so as to acquire various biosensor values from the user #1.

Moreover, the head mount device 10 may provide the functions by collaboration of a plurality of devices if the same functions can be provided. For example, the head mount device 10 may be realized by a combination of a biological information acquisition device that collects biosensor values from the user and a terminal device that performs short-range radio communication with the biological information acquisition device to acquire the collected biosensor values. The terminal device may not have a function of displaying an image within the sight of the user unlike the head mount device 10 and may have a screen for displaying optional information.

Here, the head mount device 10 executes the following process. First, the head mount device 10 acquires biosensor values from the user every predetermined period. Moreover, the head mount device 10 generates an emotional score which is made up of a combination of awakening degree and pleasant degree of the user from the acquired biosensor values. Moreover, simultaneously with acquisition of biosensor values, the head mount device 10 captures the scene captured within the sight of the user as a subject image and determines the direction of the line of sight of the user.

Moreover, the head mount device 10 transmits the calculated emotional score and a user ID (Identifier) indicating the user #1 to the emotion determining server 30 via the network 2. Further, the head mount device 10 transmits the captured subject image, line of sight information indicating the direction of the line of sight of the user within a screen, and the user ID of the user #1 to the social network server 40 via the network 2.

The emotion determining server 30 specifies the emotions of the users using the emotional scores acquired from the respective users. Specifically, the emotion determining server 30 receives the emotional scores of the users from the respective head mount devices 10 and 60. In this case, the emotion determining server 30 specifies the emotions of the respective users using the received emotional scores. For example, the emotion determining server 30 specifies whether the emotion of the user is an "excited state," a "delight state," a "relaxed state," a "bored state," a "depressed state," a "sad state," a "panic state," or an "angry state" using the awakening degree and the pleasant degree of the emotional score. Moreover, the emotion determining server 30 transmits the emotional information indicating the emotion to the social network server 40 together with the user ID of a determination target user.

The social network server 40 determines whether or not to provide the information on a second user to a first user based on the emotion of the first user toward the second user and the emotion of the second user toward the first user. Specifically, the social network server 40 determines a target of the emotion that is indicated by the emotional information received from the emotion determining server 30 using the subject images acquired by the head mount devices 10 and 60 and the line of sight information For example, the social network server 40 extracts an image of the range that the user looks at from the subject image received from the head mount device 10 using the line of sight information. Moreover, the social network server 40 specifies who is the person included in the extracted image using an optional face authentication technique or the like. After that, when the emotion determining server 30 acquires the emotion of the user determined from the emotional score that is acquired simultaneously with acquisition of the subject image and the line of sight information, the social network server 40 determines that the acquired emotion is the emotion toward the specified person.

Moreover, when the mutual emotions of the respective users meet predetermined conditions, the social network server 40 determines that the information on the second user is to be provided to the first user. For example, if it is determined that the emotion of the first user toward the second user is negative, the social network server 40 determines that the information on the second user is not to be provided to the first user.

Moreover, when the emotion of the first user toward the second user is not negative and the emotion of the second user toward the first user is favorable, the social network server 40 determines that the information on the second user is to be provided to the first user. Moreover, when both the emotion of the first user toward the second user and the emotion of the second user toward the first user are favorable, the social network server 40 determines that the information on the second user is to be provided to the first user, and that the information on the first user is to be provided to the second user.

Here, for example, favorable emotions are emotions that belong to a "super-positive state" such as an "excited state" and a "delight state," and negative emotions are emotions that belong to a "negative state" such as a "bored state," a "depressed state," and a "sad state" or emotions that belong to a "super-negative state" such as a "panic state" and an "angry state." The "relaxed state" and the like are emotions of the "positive state." For example, when the emotion of the first user toward the second user is the "relaxed state" and the emotion of the second user toward the first user is the "excited state," the social network server 40 determines that the information on the second user is to be provided to the first user.

Moreover, if it is determined that the information on the second user is to be provided to the first user, the social network server 40 provides the information on the second user to the first user. For example, the social network server 40 sends a notification that the second user has an affection for the first user or sends a suggestion to add the second user as a friend or another optional suggestion to the first user.

Next, the flow of the process executed by the social network server 40 in the information providing system 1 will be described. In the following example, a case where the head mount device 10 acquires biosensor values, subject images, and line of sight information when the user #1 looks at the user #2, and the head mount device 60 acquires biosensor values, subject images, and line of sight information when the user #2 looks at the user #1 will be described.

First, as indicated by (a) in FIG. 1, the head mount device 10 acquires the subject image, the line of sight information, and the biosensor values of the user #1. Moreover, the head mount device 10 calculates an emotional score from the biosensor values, transmits the emotional score to the emotion determining server 30 as indicated by (b) in FIG. 1, and transmits the subject image and the line of sight information to the social network server 40 as indicated by (c) in FIG. 1.

On the other hand, as indicated by (d) in FIG. 1, the head mount device 60 acquires the subject image, the line of sight information, and the emotional score of the user #2. Moreover, the head mount device 60 transmits the acquired emotional score to the emotion determining server 30 as indicated by (e) in FIG. 1, and transmits the subject image and the line of sight information to the social network server 40 as indicated by (f) in FIG. 1.

Moreover, as indicated by (g) in FIG. 1, the emotion determining server 30 determines the emotions of the users #1 and #2 using the emotional scores received from the head mount devices 10 and 60. Further, as indicated by (h) in FIG. 1, the emotion determining server 30 transmits emotional information indicating the emotions of the users #1 and #2 to the social network server 40.

On the other hand, as indicated by (i) in FIG. 1, the social network server 40 determines the emotion of the user #1 toward the user #2 and the emotion of the user #2 toward the user #1. Specifically, the social network server 40 receives the subject image and the line of sight information from the head mount device 10 and specifies a person that the user #1 looks at using the received subject image and line of sight information. Moreover, the social network server 40 determines that the person the user #1 looks at is the user #2 by executing face authentication of the specified person. As a result, the social network server 40 determines the emotion of the user #1 toward the user #2 in conjunction with the emotional information of the user #1 received from the emotion determining server 30.

Moreover, the social network server 40 receives the subject image and the line of sight information from the head mount device 60, specifies a person that the user #2 looks at using the received subject image and line of sight information, and determines that the person the user #2 looks at is the user #1 by executing face authentication of the specified person. As a result, the social network server 40 determines the emotion of the user #2 toward the user #1 in conjunction with the emotional information of the user #2 received from the emotion determining server 30.

Here, when the emotion of the user #1 toward the user #2 is an "excited state" and the emotion of the user #2 toward the user #1 is a "relaxed state," the social network server 40 notifies the user #2 of the information on the user #1 as indicated by (j) in FIG. 1. On the other hand, even when the emotion of the user #1 toward the user #2 is the "excited state," if the emotion of the user #2 toward the user #1 is a negative emotion such as a "bored state," the social network server 40 does not notify the user #2 of the information on the user #1. In this manner, the social network server 40 determines whether or not to provide the information on one user to the other user based on the mutual emotions of the respective users, it is possible to provide the information on the respective users to other users without making the respective users feel unpleasant.

The processes executed by the head mount device 10, the head mount device 60, the emotion determining server 30, and the social network server 40 need not be executed at the same time. That is, even when the time at which the emotion of the user #1 toward the user #2 is determined is different from the time at which the emotion of the user #2 toward the user #1 is determined, the social network server 40 can provide the information on the respective users to the other users without making the respective users feel unpleasant.

2. Functional Configuration of Head Mount Device

Figure 2:
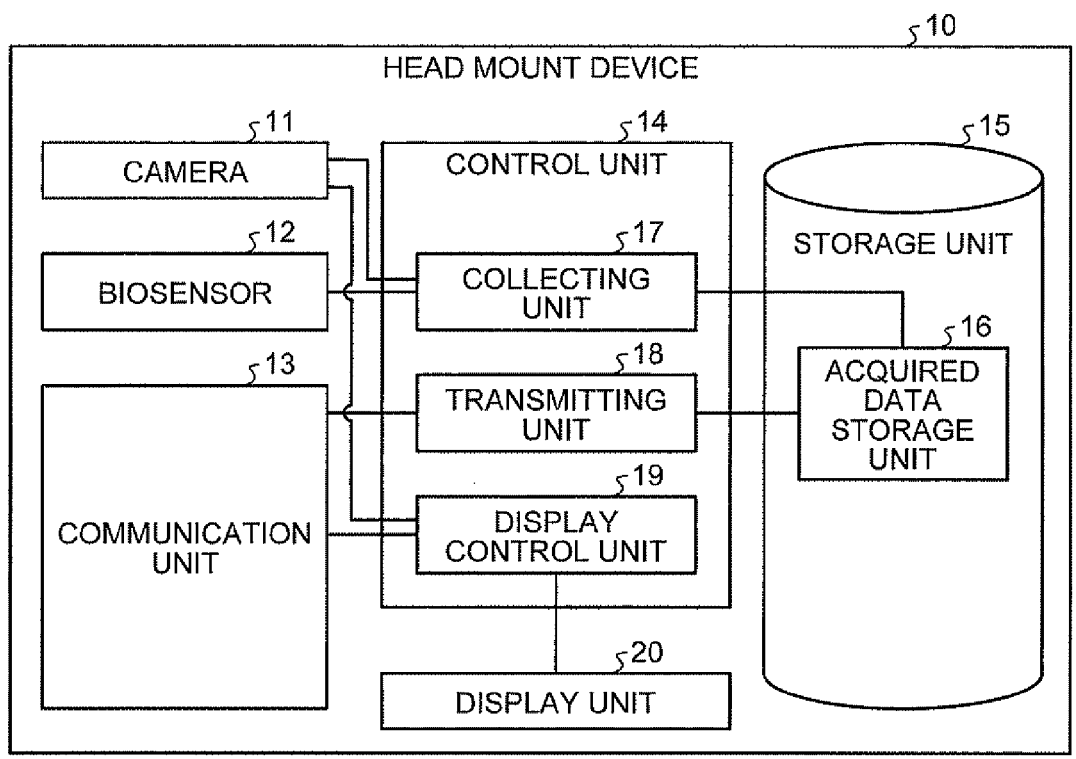
FIG. 2 is a diagram for describing an example of a functional configuration of a head mount device according to the embodiment.

Next, a functional configuration of the head mount device 10 according to the embodiment will be described with reference to FIG. 2. FIG. 2 is a diagram for describing an example of the functional configuration of the head mount device according to the embodiment. In the example illustrated in FIG. 2, the head mount device 10 includes a camera 11, a biosensor 12, a communication unit 13, a control unit 14, a storage unit 15, and a display unit 20. Moreover, the storage unit 15 includes an acquired data storage unit 16. Further, the control unit 14 includes a collecting unit 17, a transmitting unit 18, and a display control unit 19.

First, the acquired data storage unit 16 included in the storage unit 15 will be described. The acquired data storage unit 16 temporarily stores the biosensor values, the line of sight information, and the subject images acquired from the user. For example, the acquired data storage unit 16 stores the biosensor values, the line of sight information, and the subject images acquired from the user #1 in association with a time stamp that indicates the acquired time.

The camera 11 is an image acquiring device that acquires subject images. For example, the camera 11 is an image acquiring device provided next to the eye of the user and acquires subject images of the user wearing the head mount device 10 using a CCD (Charge Coupled Device) image sensor or a CMOS (Complementary Metal-Oxide Semiconductor) image sensor.

The biosensor 12 is a sensor that acquires biosensor values from the user. For example, the biosensor 12 acquires one or more biosensor values from the user. Moreover, the biosensor 12 generates an emotional score that evaluates the awakening degree and the pleasant degree in ten steps of −5 to 5 from the acquired respective biosensor values. Moreover, the biosensor 12 captures the movements of the eyeballs of the user using infrared rays or the like and specifies the range within the subject image that the user looks at.

The communication unit 13 controls communication between the head mount device 10, the emotion determining server 30, and the social network server 40. Specifically, upon receiving a sight notification including the subject image, the line of sight information, and the user ID indicating the user of the head mount device 10 from the transmitting unit 18, the communication unit 13 transmits the received sight notification to the social network server 40 via the network 2. Moreover, upon receiving an emotional score notification including the emotional score and the user ID indicating the user of the head mount device 10 from the transmitting unit 18, the communication unit 13 transmits the emotional score notification to the emotion determining server 30 via the network 2.

Moreover, upon receiving a suggestion notification including notification target information which is information for identifying another notified user and the notification content from the social network server 40, the communication unit 13 outputs the received suggestion notification to the display control unit 19. Here, the notification target information is information indicating another user notified to the user of the head mount device 10, and for example, is information for detecting another notified user within the subject image acquired by the camera 11. Moreover, the notification content is information on another user notified to the user of the head mount device 10, and for example, is a message "Someone has an affection for you."

The collecting unit 17 collects the emotional score, the subject image, and the line of sight information of the user. Specifically, the collecting unit 17 operates the camera 11 every predetermined period to acquire the subject image of the user. Moreover, the collecting unit 17 operates the biosensor 12 simultaneously with acquisition of the subject image to acquire the emotional score of the user.

Moreover, the collecting unit 17 operates the biosensor 12 to measure the glow and the movements of the eyeballs of the user and acquires the line of sight information based on the measured results. Further, the collecting unit 17 stores the collected emotional score, subject image, and line of sight information in the acquired data storage unit 16 in correlation. When the emotional score, the subject image, and the line of sight information are acquired, the collecting unit 17 stores the respective items of information in the acquired data storage unit 16 in association with a time stamp that indicates the acquired time.

The transmitting unit 18 transmits the emotional score acquired by the head mount device 10 to the emotion determining server 30 and transmits the subject image and the line of sight information acquired by the head mount device 10 to the social network server 40. Specifically, the transmitting unit 18 reads the emotional score from the acquired data storage unit 16 every predetermined period and outputs an emotional score notification including the read emotional score and the user ID indicating the user of the head mount device 10 to the communication unit 13. Further, the transmitting unit 18 reads the subject image and the line of sight information from the acquired data storage unit 16 every predetermined period and outputs a sight notification including the read subject image, line of sight information, and the user ID indicating the user of the head mount device 10 to the communication unit 13.

Upon receiving the information on other users from the social network server 40, the display control unit 19 displays the received information on the display unit 20. For example, upon receiving the suggestion notification, the display control unit 19 extracts the notification target information and the notification content from the suggestion notification. Moreover, when the notification target information and the notification content are extracted from the suggestion notification, the display control unit 19 acquires the subject image from the camera 11 and detects another notified user within the acquired subject image using the notification target information.

Moreover, when another notified user is detected, the display control unit 19 outputs the notification content to the display unit 20 together with position information indicating the position at which another user is detected from the subject image. On the other hand, if it is not possible to detect another notified user within the subject image, the display control unit 19 outputs the extracted notification content to the display unit 20 and instructs to display the notification content in a pop-up format.

The display unit 20 is a display device capable of displaying optional information within the sight of the user. For example, the display unit 20 displays information within the sight of the user by inputting an image to a free-form-surface prism provided on the line of sight of the user. Moreover, when the position information and the notification content are received from the display control unit 19, the display unit 20 displays the received notification content at a position indicated by the position information. That is, the display unit 20 displays the notification content so as to be overlapped with the image of another user notified from the social network server 40. On the other hand, upon receiving the notification content and being instructed to display the notification content in a pop-up format, the display unit 20 displays the received notification content in a pop-up format.

3. Functional Configuration of Emotion Determining Server

Figures 3, 4:
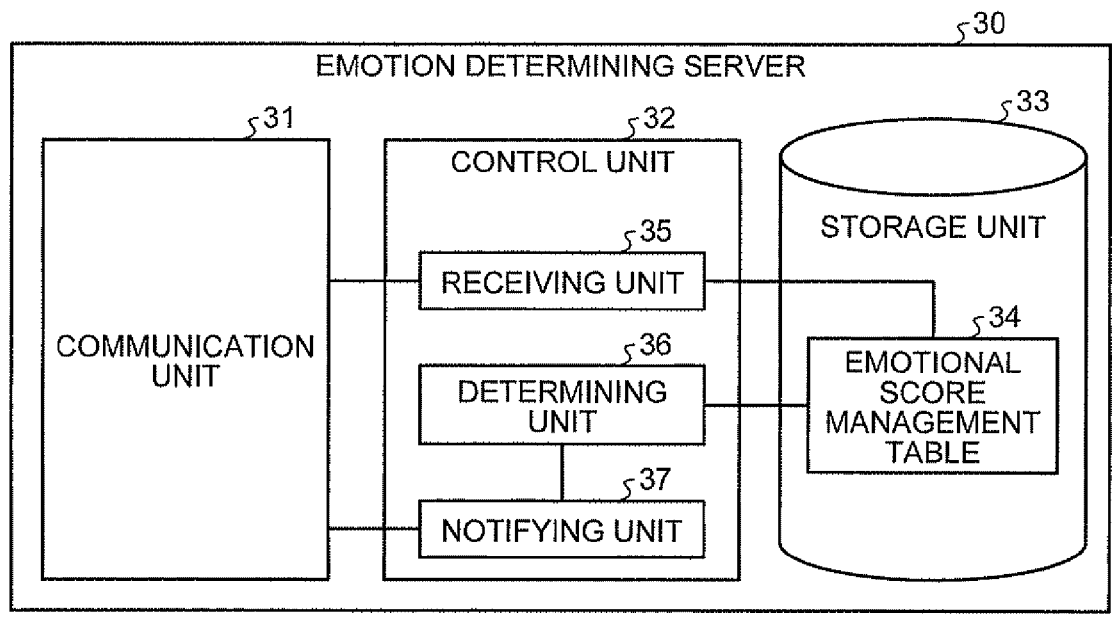
FIG. 3 is a diagram for describing an example of a functional configuration of an emotion determining server according to the embodiment.
FIG. 4 is a diagram for describing an example of information stored in an emotional score management table according to the embodiment.

Next, a functional configuration of the emotion determining server 30 according to the embodiment will be described with reference to FIG. 3. FIG. 3 is a diagram for describing an example of a functional configuration of the emotion determining server according to the embodiment. In the example illustrated in FIG. 3, the emotion determining server 30 includes a communication unit 31, a control unit 32, and a storage unit 33. Moreover, the storage unit 33 stores an emotional score management table 34. Further, the control unit 32 includes a receiving unit 35, a determining unit 36, and a notifying unit 37.

First, the emotional score management table 34 stored in the storage unit 33 will be described with reference to FIG. 4. FIG. 4 is a diagram for describing an example of information stored in the emotional score management table according to the embodiment. As illustrated in FIG. 4, the emotional score management table 34 stores a combination of awakening degree "a" and pleasant degree "b" of a user indicated by a user ID, which is the emotional score acquired from the user in a (a,b) format in correlation with the user ID.

For example, in the example illustrated in FIG. 4, the emotional score management table 34 stores emotional scores (5, 1) and (5, 3) acquired in a time-sequential order in correlation with the user ID "user #1." Moreover, in the example illustrated in FIG. 4, the emotional score management table 34 also stores emotional scores (5, −4) and (4, −3) acquired in a time-sequential order in correlation with the user ID "user #2."

Returning to FIG. 3, the description is continued.

The communication unit 31 controls communication between the emotion determining server 30, the head mount devices 10 and 60, and the social network server 40. Specifically, upon receiving the emotional score notification from the head mount devices 10 and 60 via the network 2, the communication unit 31 outputs the received emotional score notification to the receiving unit 35. Moreover, upon receiving an emotional information notification including the emotional information indicating the emotion of the user and the user ID of the user from the notifying unit 37, the communication unit 31 transmits the received emotional information notification to the social network server 40.

The receiving unit 35 receives the emotional scores acquired from the users. Specifically, upon receiving the emotional score notification from the communication unit 31, the receiving unit 35 extracts the user ID and the emotional score from the received emotional score notification. Moreover, the receiving unit 35 stores the extracted emotional score in the emotional score management table 34 in correlation with the extracted user ID.

The determining unit 36 determines the emotion of the user using the emotional score acquired from the user. For example, the determining unit 36 reads the emotional score of the determination target user from the emotional score management table 34 every predetermined period or when the emotion determining server 30 receives a new emotional score from the head mount devices 10 and 60. Moreover, the determining unit 36 extracts a time stamp associated with the read emotional score.

Moreover, the determining unit 36 determines the emotion of the user based on the read emotional score. After that, the determining unit 36 generates emotional information indicating the determined emotion of the user and associates the extracted time stamp with the generated emotional information. Moreover, the determining unit 36 outputs the emotional information and the user ID of the user to the notifying unit 37.

Figure 5:
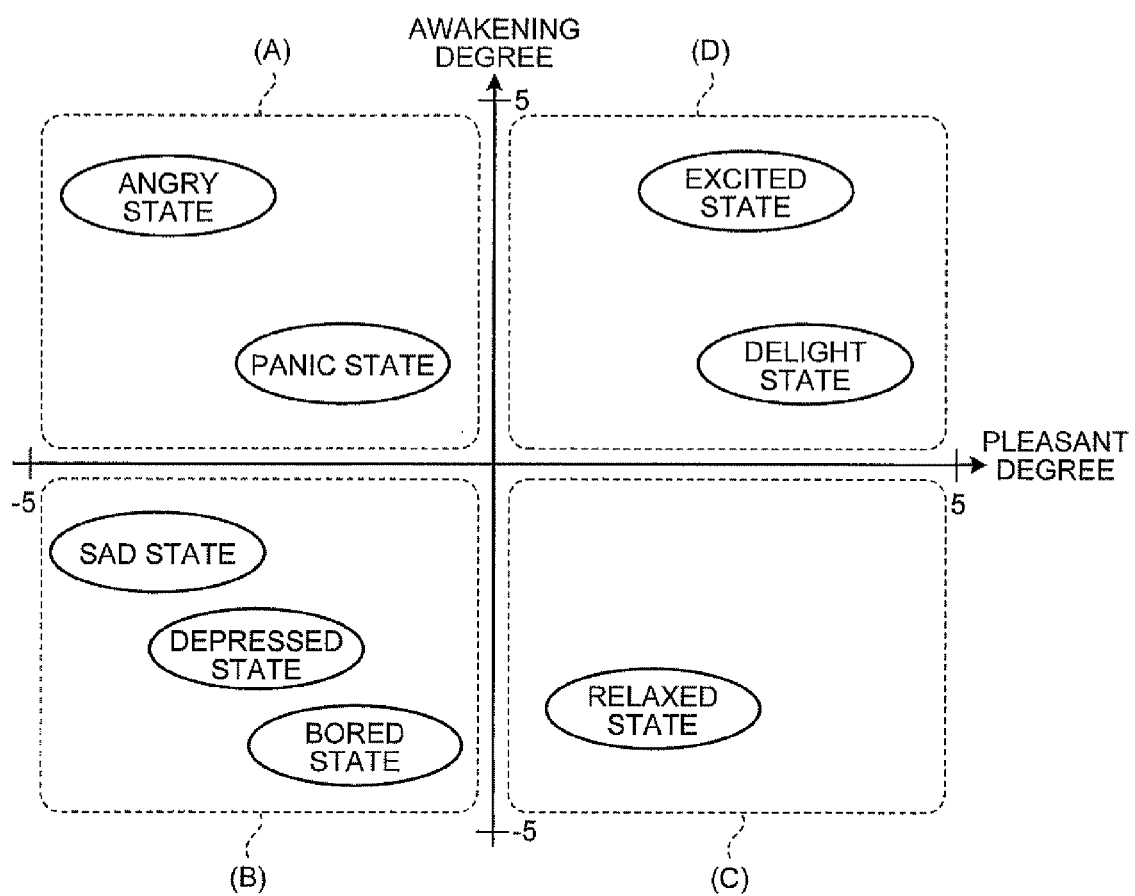
FIG. 5 is a diagram for describing an example of a process in which the emotion determining server according to the embodiment determines an emotion of a user.

Here, an example of the process in which the determining unit 36 determines the emotion of the user will be described with reference to FIG. 5. FIG. 5 is a diagram for describing an example of the process in which the emotion determining server according to the embodiment determines the emotion of the user. FIG. 5 illustrates an example of a two-dimensional emotion model used when determining the emotion from the awakening degree and pleasant degree of the user.

For example, when the awakening degree of the user has a positive value and the pleasant degree has a negative value as indicated by (A) in FIG. 5, the determining unit 36 determines that the user's emotion is the "super-negative state" such as an "angry state" or a "panic state." As a specific example, the determining unit 36 determines that the user's emotion is the "angry state" if the value of awakening degree is approximately "3" and the value of pleasant degree is in the range of approximately "−5" and "−2" and determines that the user's emotion is the "panic state" if the value of awakening degree is in the range of approximately "1" and "3" and the value of pleasant degree is in the range of approximately "−3" and "0."

Further, when the awakening degree of the user has a negative value and the pleasant degree has a negative value as indicated by (B) in FIG. 5, the determining unit 36 determines that the user's emotion is in a "negative state" such as a "sad state," a "depressed state," or a "bored state." As a specific example, the determining unit 36 determines that the user's emotion is the "sad state" if the value of awakening degree is in the range of approximately "−1" and "0" and the value of pleasant degree is in the range of approximately "−5" and "−2," determines that the user's emotion is the "depressed state" if the value of awakening degree is in the range of approximately "−3" and "−1" and the value of pleasant degree is in the range of approximately "−3" and "−1," and determines that the user's emotion is the "bored state" if the value of awakening degree is in the range of approximately "−5" and "−3" and the value of pleasant degree is in the range of approximately "−3" and "0."

Further, when the awakening degree of the user has a negative value and the pleasant degree has a positive value as indicated by (C) in FIG. 5, the determining unit 36 determines that the user's emotion is in a "positive state" such as a "relaxed state." As a specific example, the determining unit 36 determines that the user's emotion is the "relaxed state" if the value of awakening degree is in the range of approximately "−4" and "−3" and the value of pleasant degree is in the range of approximately "0" and "−3."

Furthermore, when the awakening degree of the user has a positive value and the pleasant degree has a positive value as indicated by (D) in FIG. 5, the determining unit 36 determines that the user's emotion is in a "super-positive state" such as an "excited state" or a "delight state." As a specific example, the determining unit 36 determines that the user's emotion is the "excited state" if the value of awakening degree is in the range of approximately "3" and "5" and the value of pleasant degree is in the range of approximately "3" and "4" and determines that the user's emotion is the "delight state" if the value of awakening degree is in the range of approximately "0" and "2" and the value of pleasant degree is in the range of approximately "2" and "5."

Here, an example of the process executed by the determining unit 36 will be described. For example, the determining unit 36 acquires an awakening degree-pleasant degree combination "(5, −4)" correlated with the user ID "user #2" of the user #2 from the emotional score management table 34 illustrated in FIG. 4. Moreover, the determining unit 36 determines the emotion of the user #2 is the "angry state" from the acquired awakening degree-pleasant degree combination "(5, −4)." After that, the determining unit 36 associates the time stamp associated with the acquired awakening degree-pleasant degree combination with the emotional information indicating the "angry state" and notifies the notifying unit 37 of the emotional information and the user ID "user #2" of the user #2.

The two-dimensional emotion model illustrated in FIG. 5 is only an example, and the emotion determining server 30 can determine the user's emotion using an optional emotion model. For example, the determining unit 36 may determine the user's emotion from a change over time in the awakening degree and the pleasant degree using a plurality of awakening degree-pleasant degree combinations.

Returning to FIG. 3, the description is continued.

The notifying unit 37 notifies the social network server 40 of the user's emotion. Specifically, the notifying unit 37 receives the user ID and the emotional information indicating the emotion of the user indicated by the user ID from the determining unit 36. In this case, the notifying unit 37 generates an emotional information notification including the emotional information indicating the user's emotion and the user ID and outputs the generated emotional information notification to the communication unit 31.

4. Functional Configuration of Social Network Server

Figure 6:
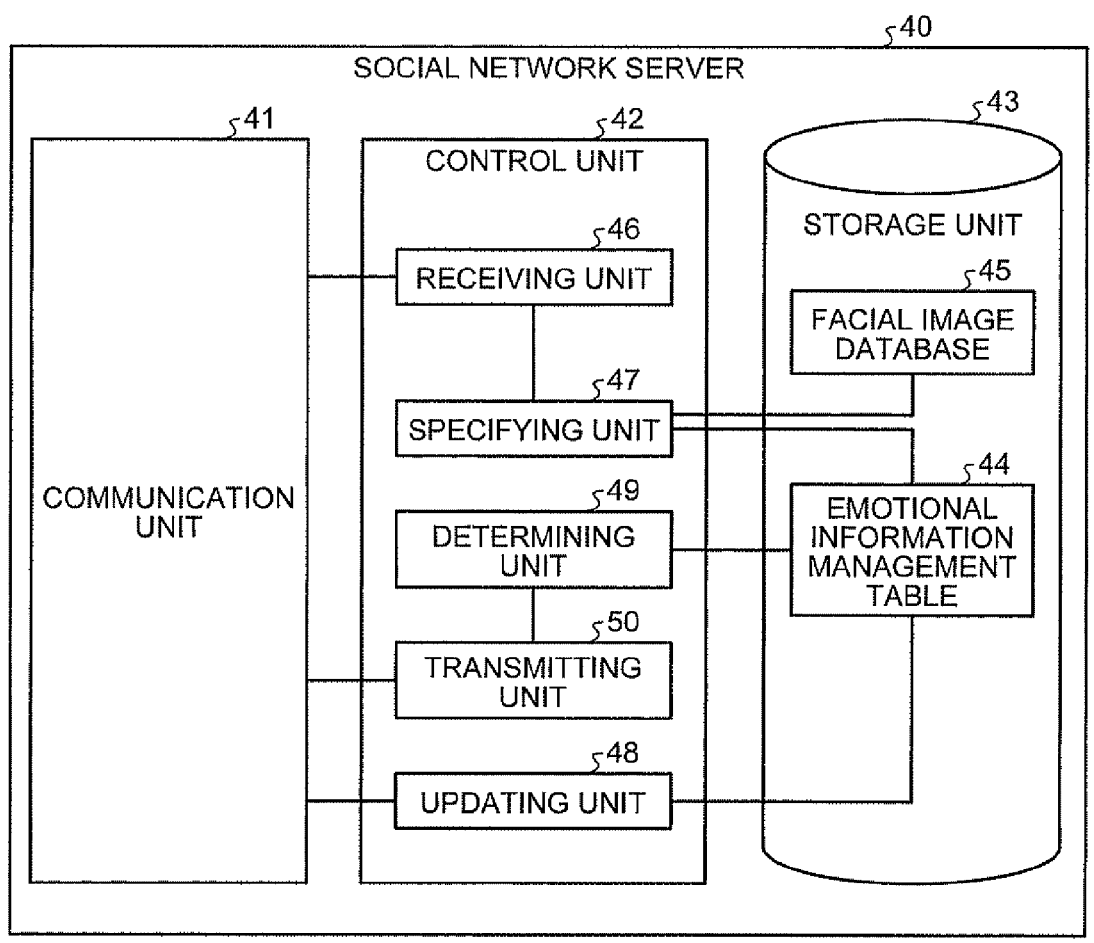
FIG. 6 is a diagram for describing an example of a functional configuration of a social network server according to the embodiment.

Next, a functional configuration of the social network server 40 according to the embodiment will be described with reference to FIG. 6. FIG. 6 is a diagram for describing an example of the functional configuration of the social network server according to the embodiment. In the example illustrated in FIG. 6, the social network server 40 includes a communication unit 41, a control unit 42, and a storage unit 43. Moreover, the storage unit 43 stores an emotional information management table 44 and a facial image database 45. Further, the control unit 42 includes a receiving unit 46, a specifying unit 47, an updating unit 48, a determining unit 49, and a transmitting unit 50.

First, an example of the information stored in the emotional information management table 44 stored in the storage unit 43 will be described. The emotional information management table 44 stores the emotional information indicating the emotion of respective users toward other users. For example, FIG. 7 is a diagram for describing an example of the emotional information management table according to the embodiment. As illustrated in FIG. 7, the emotional information management table 44 stores the user ID indicating the user who possesses an emotion, target information which is the user ID of the user serving as a target of the emotion, and emotional information in correlation.

For example, in the emotional information management table 44 of the example illustrated in FIG. 7, a user ID "user #1," target information "user #2," and emotional information "excited state" are stored in correlation, and a user ID "user #1," target information "user #3," and emotional information "excited state" are stored in correlation.

Moreover, in the emotional information management table 44, a user ID "user #2," target information "user #1," and emotional information "negative state" are stored in correlation, and a user ID "user #2," target information "user #3," and emotional information "excited state" are stored in correlation. Further, in the emotional information management table 44, a user ID "user #3," target information "user #1," and emotional information "relaxed state" are stored in correlation, and a user ID "user #3," target information "user #2," and emotional information "excited state" are stored in correlation.

That is, in the example illustrated in FIG. 7, the emotional information management table 44 indicates that the emotion of the user #1 toward the user #2 is the "excited state" and the emotion of the user #1 toward the user #3 is the "excited state." Moreover, the emotional information management table 44 also indicates that the emotion of the user #2 toward the user #1 is the "negative state" and the emotion of the user #2 toward the user #3 is the "excited state." Further, the emotional information management table 44 also indicates that the emotion of the user #3 toward the user #1 is the "relaxed state" and the emotion of the user #3 toward the user #2 is the "excited state."

Returning to FIG. 6, the description is continued.
The facial image database 45 is a database of image data obtained by imaging the faces of the users of the head mount devices 10 and 60, and for example, is a database in which the user IDs of the respective users and the facial images of the users indicated by the user IDs are stored in correlation.

The communication unit 41 controls communication between the social network server 40, the head mount devices 10 and 60, and the emotion determining server 30. For example, when the sight notification is received from the head mount devices 10 and 60, the communication unit 41 outputs the received sight notification to the receiving unit 46. Moreover, when the emotional information notification is received from the emotion determining server 30, the communication unit 41 outputs the received emotional information notification to the updating unit 48. Further, when the suggestion notification and the user ID of the user serving as a transmission destination of the suggestion notification are received from the transmitting unit 50, the communication unit 41 transmits the received suggestion notification to the head mount device worn by the user indicated by the received user ID.

Upon receiving the sight notification from the communication unit 41, the receiving unit 46 extracts the user ID, the subject image, and the line of sight information from the received sight notification. Moreover, the communication unit 41 outputs the extracted user ID, subject image, and line of sight information to the specifying unit 47.

The specifying unit 47 specifies the target of the emotion possessed by the user using the subject image and the line of sight information. Specifically, upon receiving the user ID, the subject image, and the line of sight information from the receiving unit 46, the specifying unit 47 acquires the time stamp indicating the time at which the subject image and the line of sight information were acquired from the received subject image and line of sight information.

Moreover, the specifying unit 47 specifies the target of the emotion possessed by the user indicated by the user ID using the received subject image and line of sight information. For example, the specifying unit 47 determines whether the face of a person is captured within the range indicated by the line of sight information, of the received subject image. Moreover, when the face of a person is captured within the range indicated by the line of sight information, the specifying unit 47 extracts the image of the face of the person captured. Further, the specifying unit 47 compares the extracted facial image with the respective facial images stored in the facial image database 45 and executes a face authentication process to identify a person that matches the extracted face.

Moreover, when the result of the face authentication process indicates that the image of the same face of the person as the extracted facial image is stored in the facial image database 45, the specifying unit 47 acquires the user ID correlated with the facial image. Moreover, the specifying unit 47 uses the acquired user ID as target information and stores the user ID received from the receiving unit 46 and the target information in the emotional information management table 44 in correlation. Further, the specifying unit 47 stores a combination of the user ID and the corresponding information and the acquired time stamp in the emotional information management table 44 in correlation.

When the face of a person is not captured within the range indicated by the line of sight information, the specifying unit 47 discards the received subject image and line of sight information and ends the process. Moreover, the specifying unit 47 may request another server or cloud (not illustrated) to execute the face authentication process. Moreover, the face authentication process executed by the specifying unit 47 is realized by an existing technique, and the description thereof is not provided.

The updating unit 48 updates the emotional information management table 44. For example, upon receiving the emotional information notification from the communication unit 41, the updating unit 48 extracts the user ID and the emotional information from the received emotional information notification. Moreover, the updating unit 48 specifies a combination serving as an emotional information updating target from the combinations of user ID and target information stored in the emotional information management table 44. Further, the updating unit 48 stores the extracted emotional information in the emotional information management table 44 in correlation with the specified user ID-target information combination.

Here, an example of a process in which the updating unit 48 specifies a user ID-target information combination serving as an emotional information updating target from the emotional information management table 44 will be described. First, the updating unit 48 extracts a time stamp (that is, a time stamp indicating the acquired time of the emotional score used when determining the emotion indicated by the emotional information) associated with the emotional information from the emotional information extracted from the emotional information notification. Moreover, the updating unit 48 specifies an entry correlated with a time stamp having a value that is identical to or is closest to that of the time stamp extracted from the emotional score among the entries of the emotional information management table 44, including the user ID extracted from the emotional information notification.

After that, the updating unit 48 updates the emotional information of the specified entry with the emotional information extracted from the emotional information notification. That is, the updating unit 48 stores the target information and the emotional information specified from the emotional scores, subject images, and line of sight information acquired at the same period in the emotional information management table 44 in correlation.

The determining unit 49 determines whether the emotion of the first user toward the second user and the emotion of the second user toward the first user meet predetermined conditions. For example, when the emotional information stored in the emotional information management table 44 is updated by the updating unit 48, the determining unit 49 acquires the user ID, the target information, and the emotional information stored in the entry that includes the updated emotional information. Moreover, the determining unit 49 retrieves an entry that uses the acquired user ID as target information and the acquired target information as the user ID from the emotional information management table 44.

Here, when the entry is not present, in which the acquired user ID is used as the target information and the acquired target information is used as the user ID in the emotional information management table 44, the determining unit 49 ends the process. On the other hand, when the entry is detected, in which the acquired user ID is used as the target information and the acquired target information is used as the user ID, the determining unit 49 acquires the emotional information from the detected entry. That is, the determining unit 49 acquires emotional information indicating the mutual emotions of two users.

Moreover, the determining unit 49 determines whether or not to provide information on each user to the other user depending on whether the acquired emotional information meets predetermined conditions. Further, the determining unit 49 notifies the transmitting unit 50 of the user ID of the user to which the information is provided and the user ID of the user who is the information provider according to the determination result.

The determining unit 49 may extract a combination of emotional information of the respective users, stored in the emotional information management table 44 every predetermined period, for example, rather than the time when the emotional information management table 44 is updated, and may determine whether the extracted emotional information combination meets predetermined conditions.

Hereinafter, an example of the process executed by the determining unit 49 will be described. For example, when the emotional state of a user toward the other user is the "super-positive state" such as the "excited state" and the emotional state of the other user to the one user is the "positive state" such as the "relaxed state," the determining unit 49 determines that the information on the user in the "super-positive state" is to be provided to the user in the "positive state." In this case, the determining unit 49 notifies the transmitting unit 50 of the user ID indicating the user in the "super-positive state" as the user ID of the user to which the emotion is provided and notifies the transmitting unit 50 of the user ID of the user in the "positive state" as the user ID of the user who is the information provider.

Moreover, when the emotional states of both users are the "super-positive state" such as the "excited state," the determining unit 49 determines that the items of information on the respective users are to be provided to the other users. In this case, the determining unit 49 notifies the transmitting unit 50 of the user IDs of the respective users as the user ID of the user to which the information is provided and the user ID of the user who is the information provider. The determining unit 49 determines that the information of the user is not to be provided when the emotional state of one user is the "super-negative state" or the "negative state." In this case, the determining unit 49 ends the process without notifying the transmitting unit 50 of the user ID.

Figure 8:
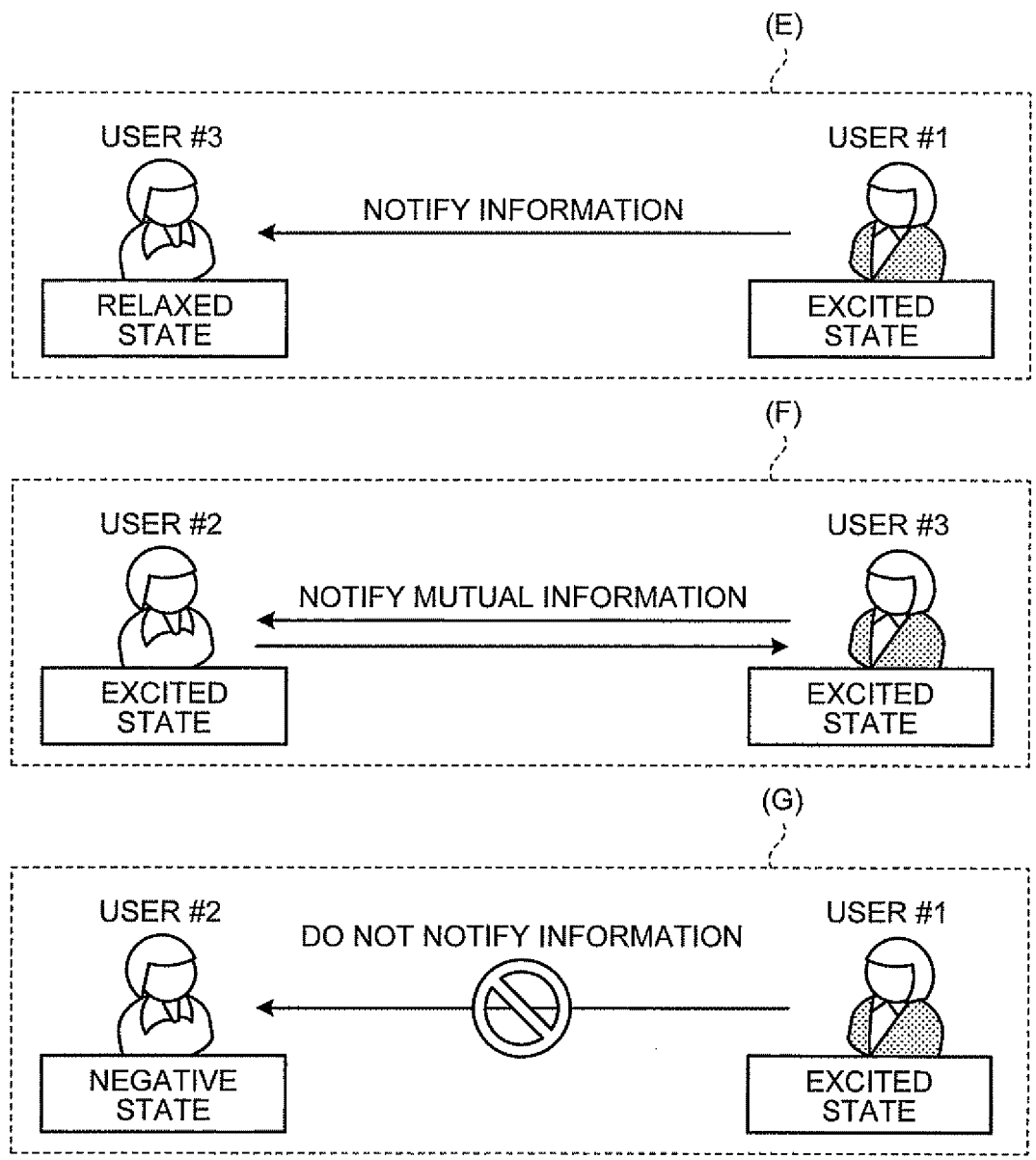
FIG. 8 is a diagram for describing an example of a determining process executed by the social network server according to the embodiment.

Hereinafter, a specific example of the process executed by the determining unit 49 when the information illustrated in FIG. 7 is stored in the emotional information management table 44 will be described with reference to FIG. 8. FIG. 8 is a diagram for describing an example of the determining process executed by the social network server according to the embodiment.

For example, the determining unit 49 acquires, from the emotional information management table 44, the emotional information "excited state" correlated with the combination of the user ID "user #1" and the target information "user #3" and the emotional information "relaxed state" correlated with the combination of the user ID "user #3" and the target information "user #1." In this case, the determining unit 49 determines that the information on the user of which the user ID is "user #1" is to be notified to the user of which the user ID is "user #3" as indicated by (E) in FIG. 8. Moreover, the determining unit 49 notifies the transmitting unit 50 of "user #1" as the user ID of the user to which the information is provided and notifies the transmitting unit 50 of "user #3" as the user ID of the user who is the information provider.

Moreover, for example, the determining unit 49 acquires, from the emotional information management table 44, the emotional information "excited state" correlated with the combination of the user ID "user #2" and the target information "user #3" and the emotional information "excited state" correlated with the combination of the user ID "user #3" and the target information "user 42." In this case, the determining unit 49 determines that the mutual items of information are to be notified to the user of which the user ID is "user #2" and to the user of which the user ID is "user #3" as indicated by (F) in FIG. 8.

Moreover, the determining unit 49 notifies the transmitting unit 50 of "user #2" as the user ID of the user to which the information is provided and notifies the transmitting unit 50 of "user #3" as the user ID of the user who is the information provider. Further, the determining unit 49 notifies the transmitting unit 50 of "user #3" as the user ID to which the information is provided and notifies the transmitting unit 50 of "user #2" as the user ID of the user who is the information provider.

Moreover, for example, the determining unit 49 acquires, from the emotional information management table 44, the emotional information "excited state" correlated with the combination of the user ID "user #1" and the target information "user #2" and the emotional information "negative state" correlated with the user ID "user #2" and the target information "user #1." In this case, the determining unit 49 determines that the information on the user of which the user ID is "user #1" is not to be notified to the user of which the user ID is "user #2" as indicated by (G) in FIG. 8. Moreover, the determining unit 49 ends the process without notifying the transmitting unit 50 of the user ID.

Returning to FIG. 6, the description is continued.

When the emotion of the first user toward the second user and the emotion of the second user toward the first user meet predetermined conditions, the transmitting unit 50 notifies the first user of the information on the second user. Specifically, the transmitting unit 50 receives the user ID of the user to which the information is provided and the user ID of the user who is the information provider from the determining unit 49.

In this case, the transmitting unit 50 generates notification target information using the user ID of the user to which the information is provided. For example, the transmitting unit 50 acquires information for identifying the face of the user to which the information is provided using the user ID of the user to which the information is provided from a management server or the like that manages information for allowing the head mount devices 10 and 60 to identify the faces of the users. Moreover, the transmitting unit 50 generates the notification target information including the acquired information.

Moreover, the transmitting unit 50 generates a notification content such as a sentence that is displayed on the head mount device of the user who is the information provider. Further, the transmitting unit 50 generates a suggestion notification including the generated notification target information and notification content and outputs the generated suggestion notification to the communication unit 41 using the user ID of the user who is the information provider as a destination.

5. Variation of Process Executed by Social Network Server

In the above embodiment, the social network server 40 determines whether the information on the other user is to be notified according to the emotions of the users. However, the embodiment is not limited to this.

For example, the social network server 40 may determine whether or not to notify the information of other users depending on the user's emotion and the user's position. Specifically, the social network server 40 may operate in an event mode in which it determines that the information of one user is to be notified to the other user when the emotions of the users meet predetermined conditions and the users are positioned within a predetermined area.

Figure 9:
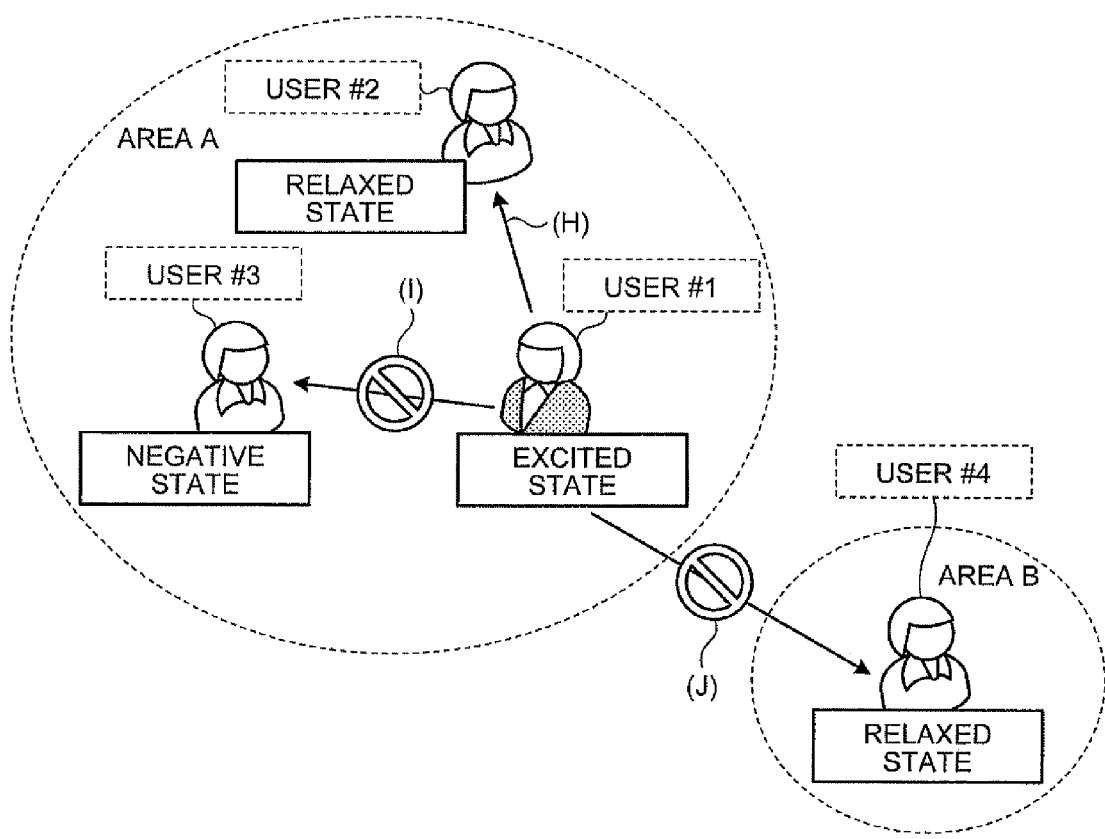
FIG. 9 is a diagram for describing a variation of the process executed by the social network server according to the embodiment.

Hereinafter, a variation of the process executed by the social network server 40 will be described with reference to FIG. 9. FIG. 9 is a diagram for describing the variation of the process executed by the social network server according to the embodiment. In the example illustrated in FIG. 9, the users #1, #2, and #3 are positioned in the range of area A, and the user #4 is positioned in area B.

Moreover, in the example illustrated in FIG. 9, the emotion of the user #1 toward the users 42, #3, and #4 is the "excited state" and the emotion of the user #2 toward the user #1 is the "relaxed state." Moreover, in the example illustrated in FIG. 9, the emotion of the user #3 toward the user #1 is the "negative state" and the emotion of the user #4 toward the user #1 is the "relaxed state."

For example, in the example illustrated in FIG. 9, the emotion of the user #1 is the "excited state," the emotion of the user #2 is the "relaxed state," and the users #1 and #2 are positioned in the same area A. Thus, the social network server 40 determines that the information of the user #1 is to be notified to the user #2 as indicated by (H) in FIG. 9. Moreover, in the example illustrated in FIG. 9, the emotion of the user #1 is the "excited state" and the emotion of the user #3 is the "negative state." Thus, the social network server 40 determines that the information on the user #1 is not to be notified to the user #3 as indicated by (I) in FIG. 9.

Here, in the example illustrated in FIG. 9, since the emotion of the user #1 is the "excited state" and the emotion of the user #4 is the "relaxed state," it may be determined that it is okay to notify the user #4 of the information on the user #1. However, since the users #1 and #4 are positioned in different areas, it may be considered that there is not much point in notifying the user #4 of the information on the user #1. Therefore, the social network server 40 determines that the information of the user #1 is not to be provided to the user #4 as indicated by (J) in FIG. 9.

As illustrated in FIG. 9, when determining whether or not to notify the information of the other user by taking the positions of the respective users into consideration, the social network server 40 executes the process every predetermined period rather than only when the emotional information is updated. For example, the social network server 40 may determine every predetermined period whether the emotions of the respective users meet predetermined conditions and the respective users are positioned in a predetermined range by referring to the emotional information management table 44.

Moreover, the social network server 40 can acquire the positions of the respective users using any method. For example, the social network server 40 may determine whether the respective users are positioned in a predetermined range depending on the positions of a GPS (global positioning system), a base station, and an access point that communicates with the head mount device worn by the respective users.

When the emotion of the user #1 toward the user #2 is the "excited state" and the emotion of the user #2 toward the user #1 is the "relaxed state," the social network server 40 may notify the user #2 of the fact that there is a person who likes the user #2 while leaving the information on the user #1 anonymous.

Moreover, when the users are in the same area, the social network server 40 may notify the other user after the respective users are separated from each other without providing the information on the other users. For example, when the emotion of the user #1 toward the user #2 is the "excited state" and the emotion of the user #2 toward the user #1 is the "relaxed state," the social network server 40 determines whether the users #1 and #2 are in the same area.

Here, when the users #1 and #2 are in the same area, the social network server 40 is in standby without notifying the user #2 of the information on the user #1. Moreover, if it is determined that the users #1 and #2 are in different areas, that is, if it is determined that the users #1 and #2 are separated from each other, the social network server 40 may notify the user #2 of the information on the user #1.

6. Example of Display on Head Mount Device

Figure 10:
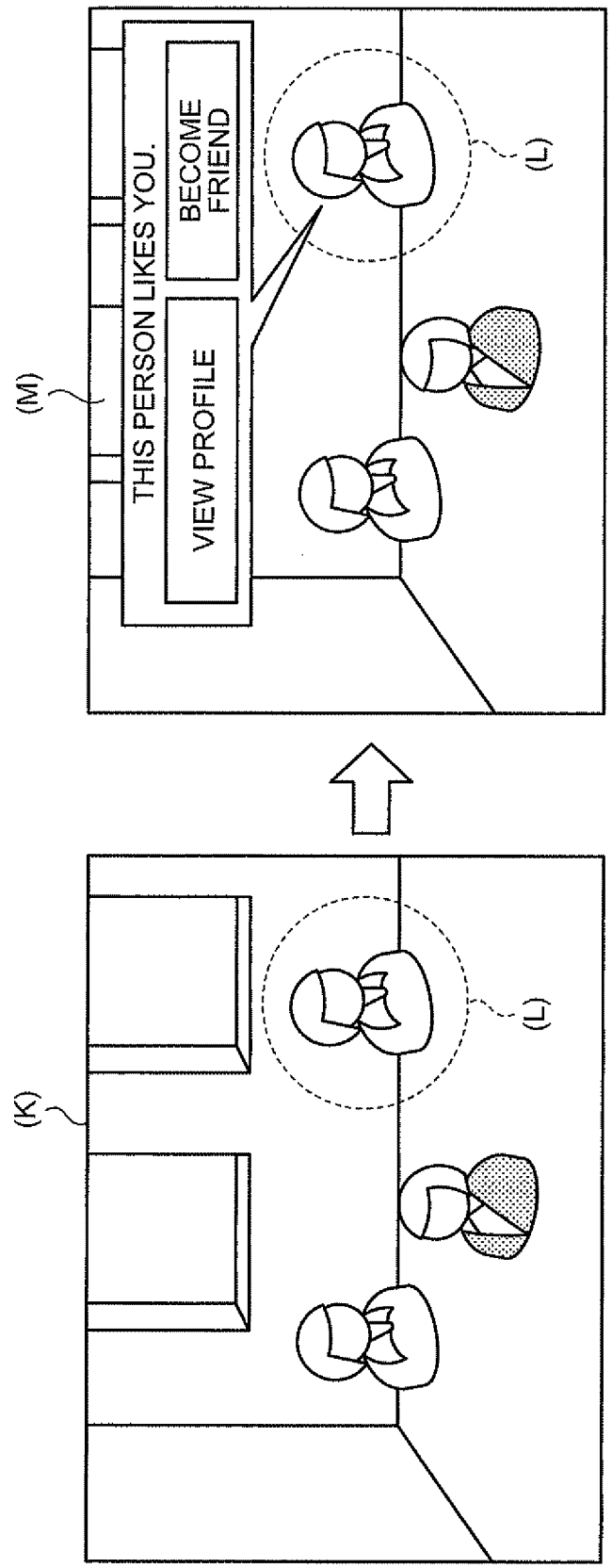
FIG. 10 is a diagram for describing an example of the information displayed by the head mount device according to the embodiment.

Next, an example of the information displayed by the head mount device 10 will be described with reference to FIG. 10. FIG. 10 is a diagram for describing an example of the information displayed by the head mount device according to the embodiment. FIG. 10 illustrates an example of the sight of the user wearing the head mount device 10.

For example, the head mount device 10 acquires a subject image including three users as indicated by (K) in FIG. 10. Here, when the user faces along the line of sight in the range indicated by (L) in FIG. 10, the head mount device 10 acquires the line of sight information which is the information of the range indicated by (L) in FIG. 10 and transmits the subject image and the line of sight information to the social network server 40. Moreover, the head mount device 10 acquires the emotional score of the user and transmits the acquired emotional score to the emotion determining server 30.

As a result, when the emotion of the user wearing the head mount device 10 toward the user indicated by (L) in FIG. 10 and the emotion of the user indicated by (L) in FIG. 10 toward the user wearing the head mount device 10 meet predetermined conditions, the head mount device 10 receives a notification (that is, a suggestion notification) of the user indicated by (L) in FIG. 10 from the social network server 40.

In this case, the head mount device 10 displays a window including a message "This person likes you" and buttons for updating a social graph such as "View profile" and "Become friend" so as to be overlapped with the user indicated by (L)

in FIG. 10 as indicated by (M) in FIG. 10. Thus, the head mount device 10 can allow the user to easily identify the suggested user.

7. Flow of Process Executed by Information Providing System

Figure 11:
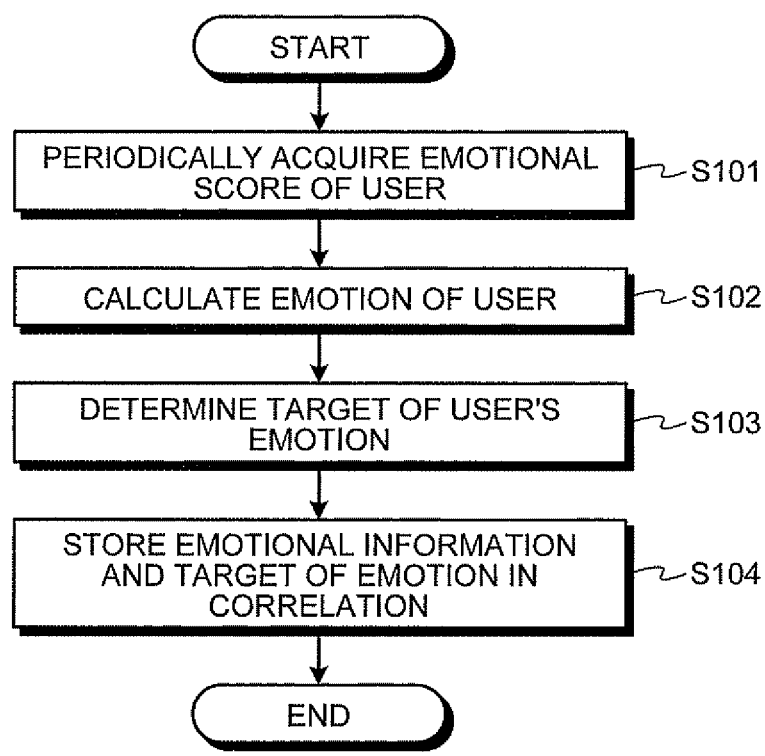
FIG. 11 is a flowchart for describing a flow of the process executed by the information providing system according to the embodiment.

Next, an example of a process in which the information providing system according to the embodiment specifies the emotions of the respective users will be described with reference to FIG. 11. FIG. 11 is a flowchart for describing the flow of the process executed by the information providing system according to the embodiment. For example, in the example illustrated in FIG. 11, the head mount device 10 acquires the emotional score of the user periodically (step S101).

Subsequently, the emotion determining server 30 calculates the emotion of the user using the emotional score acquired by the head mount device 10 (step S102). Subsequently, the social network server 40 determines a target of the user's emotion (step S103). Moreover, the social network server 40 stores the emotional information and the target of the emotion in correlation (step S104) and ends the process.

7-1. Flow of Process Executed by Social Network Server

Figure 12:
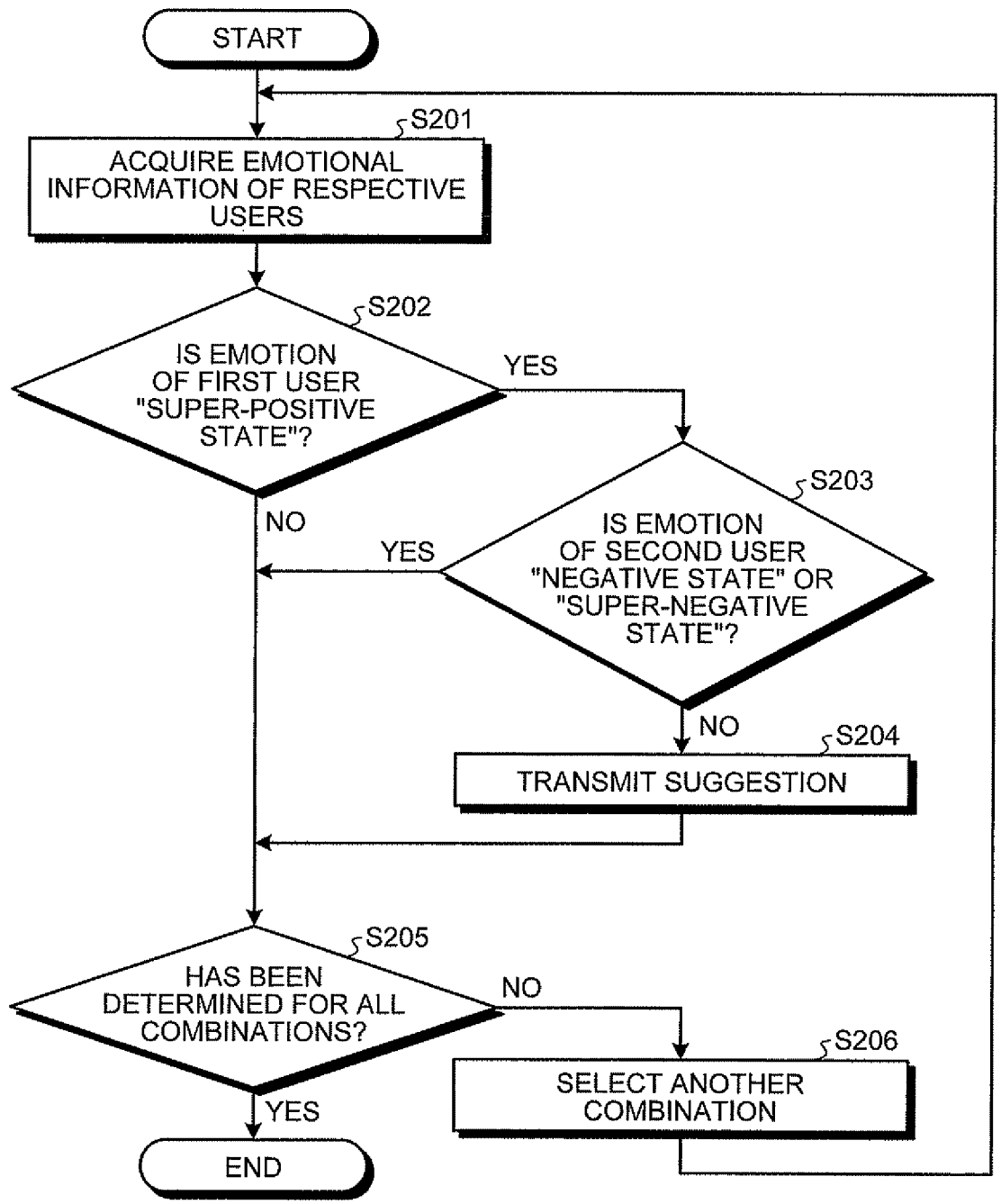
FIG. 12 is a flowchart for describing the flow of the process executed by the social network server according to the embodiment.

Next, the flow of a process in which the social network server 40 determines whether or not to notify the other user of the information on one user depending on the emotions of the respective users toward counterparts. FIG. 12 is a flowchart for describing the flow of the process executed by the social network server according to the embodiment. In the example illustrated in FIG. 12, the flow of a process of determining whether or not to notify the second user of the information on the first user is described.

For example, the social network server 40 acquires the emotional information indicating the emotion of the first user toward the second user and the emotional information indicating the emotion of the second user toward the first user from the emotional information management table 44 (step S201). Subsequently, the social network server 40 determines whether the emotion of the first user toward the second user is the "super-positive state" (step S202). Moreover, when the emotion of the first user toward the second user is the "super-positive state" (Yes in step S202), the social network server 40 determines whether the emotion of the second user toward the first user is the "negative state" or the "super-negative state" (step S203).

Moreover, when the emotion of the second user toward the first user is not the "negative state" or the "super-negative state" (No in step S203), the social network server 40 transmits a suggestion of the first user to the second user (step S204). Moreover, the social network server 40 checks whether it has been determined whether or not to transmit a suggestion to all combinations of users (step S205). When it has been determined whether or not to transmit a suggestion to all combinations of users (Yes in step S205), the social network server 40 ends the process. On the other hand, if it is determined that it has not been determined whether or not to transmit a suggestion to all users (No in step S205), the social network server 40 selects another combination of users (step S206) and executes step S201.

Moreover, when the emotion of the first user toward the second user is not the "super-positive state" (No in step S202), the social network server 40 executes step S205. Moreover, when the emotion of the second user toward the first user is the "negative state" or the "super-negative state" (Yes in step S203), the social network server 40 executes step S205.

8. Modifications

The information providing system 1 according to the embodiment may be embodied in various other forms besides the embodiment described above. Therefore, another embodiment of the information providing system 1 will be described below.

8-1. Process of Changing Message Displayed Depending on User's Emotion

The information providing system 1 according to the above-described embodiment provides the information on the second user to the first user depending on the emotion of the first user toward the second user and the emotion of the second user toward the first user. However, the embodiment is not limited to this. For example, the information providing system 1 may change the content of the information in which the second user is introduced and provided to the first user depending on the emotion of the first user toward the second user and the emotion of the second user toward the first user.

Figure 13:
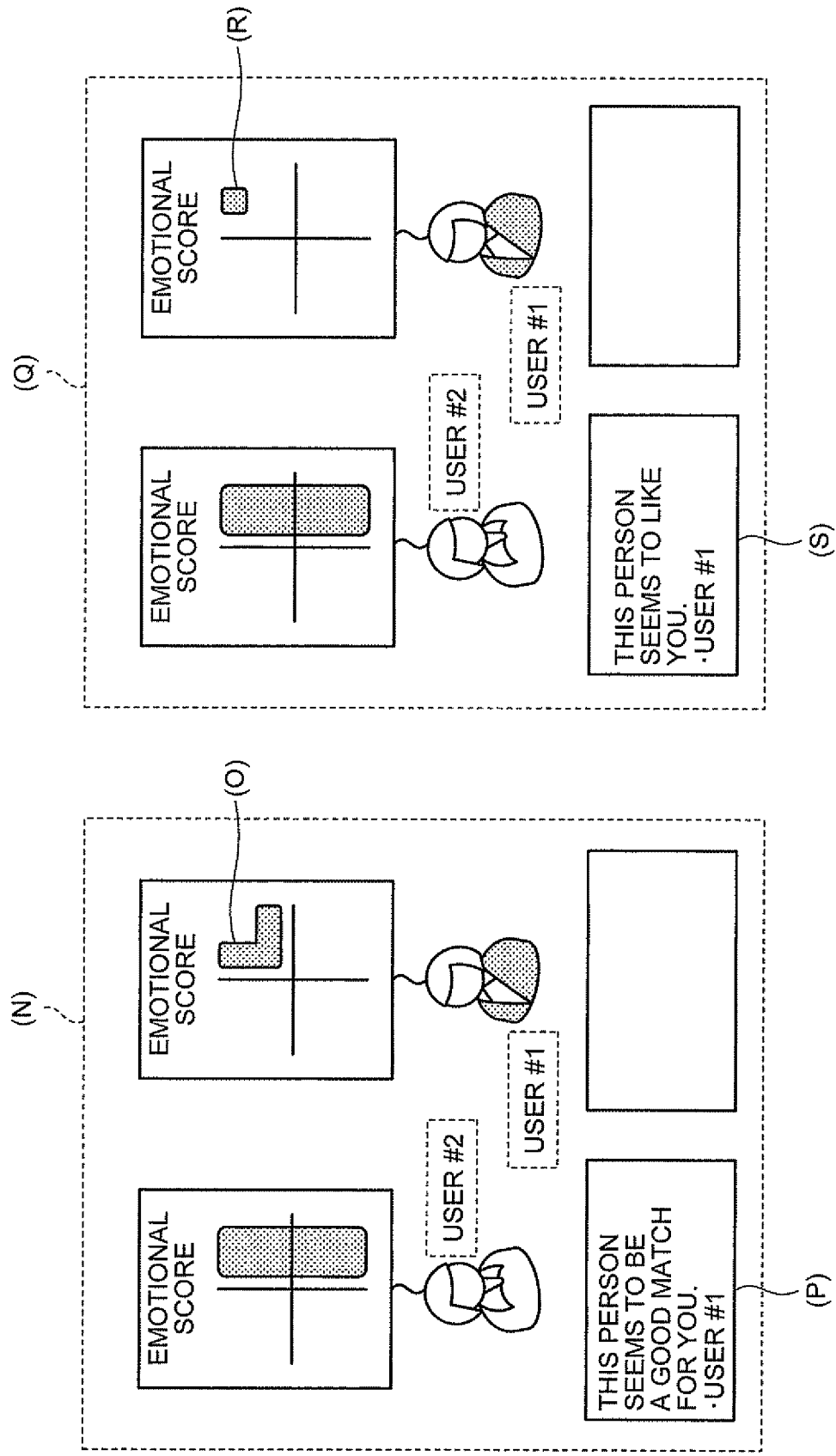
FIG. 13 is a diagram for describing an example of the process of changing displayed information according to mutual emotions.

Hereinafter, an example of a process of changing the information provided to the first user depending on the emotion of the first user toward the second user and the emotion of the second user toward the first user is described with reference to FIG. 13. FIG. 13 is a diagram for describing an example of the process of changing the displayed information depending on the mutual emotions. FIG. 13 illustrates an example of the information that the head mount device 10 of the user #2 displays depending on the emotion of the user #1 toward the user #2 when the emotion of the user #2 toward the user #1 is the "super-positive state" or the "positive state." In the "emotional score" diagram of FIG. 13, the emotional score of the user #1 toward the user #2 and the emotional score of the user #2 toward the user #1 have values in the illustrated areas on the axes of awakening degree and pleasant degree.

For example, in the example indicated by (N) in FIG. 13, the emotion of the user #1 toward the user #2 belongs to a range indicated by (O) in FIG. 13. Specifically, the emotion of the user #1 upon watching the user #2 is the "super-positive state," and either one of the awakening degree and pleasant degree is larger than a predetermined threshold value. In this case, the head mount device 10 displays the name of "user #1" together with a message "This person seems to be a good match for you" as indicated by (P) in FIG. 13.

On the other hand, in the example indicated by (Q) in FIG. 13, the emotion of the user #1 toward the user #2 belongs to a range indicated by (R) in FIG. 13. Specifically, the emotion of the user #1 upon watching the user #2 is the "super-positive state," and both the awakening degree and the pleasant degree are larger than a predetermined threshold value. In this case, the head mount device 10 displays the name of "user #1" together with a message "This person seems to like you" as indicated by (S) in FIG. 13.

In this manner, the information providing system 1 changes the message displayed on the head mount device 10 since the message when the user #1 for whom the user #2 has a favorable emotion has a strong favorable emotion toward the user #2 is different from the message when the user #1 has a favorable emotion toward the user #2. Thus, the information providing system 1 can provide the emotions of the other users to the respective users in such a format that the emotions can be easily identified. The information providing system 1 does not display the information on the user #1 on the head mount device 10 when the user #2 has an emotion of the "negative state" or the "super-negative state" toward the user #1, or when the emotion toward the user 1 is not detected.

The information providing system 1 may not only provide the information on the other users to the users, but also may display other information corresponding to the emotions of the users. For example, when the users #1 and #2 have emotions that meet predetermined conditions, the social network server 40 may refer to the schedules registered in advance by the users #1 and #2 and display the date on which the schedules of both users are vacant on the head mount devices 10 and 60. Moreover, the social network server 40 may retrieve an event that both users would be interested in by referring to the hobbies and likings registered in advance by the users #1 and #2 and may display the retrieved event on the head mount devices 10 and 60.

Figure 14:
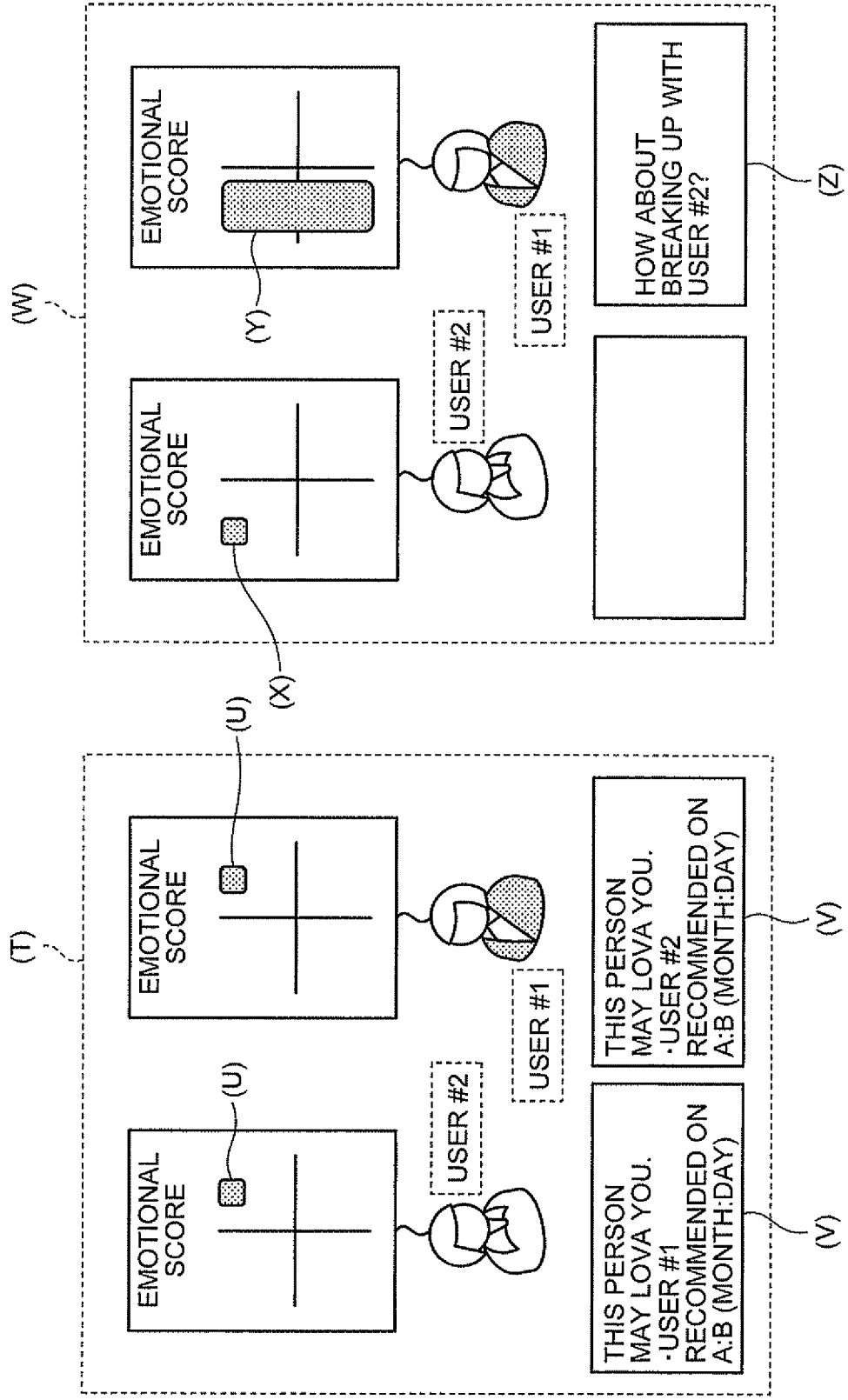
FIG. 14 is a diagram for describing an example of the information provided by the information providing system according to the embodiment.

For example, FIG. 14 is a diagram for describing an example of the information provided by the information providing system according to the embodiment. FIG. 14 illustrates an example of the emotion of the user #2 toward the user #1, the emotion of the user #1 toward the user #2, and the information displayed by the head mount devices 10 and 60 similarly to FIG. 13. In the "emotional score" in FIG. 14, similar to FIG. 13, the emotional score of the user #1 toward the user #2 and the emotional score of the user #2 toward the user #1 have values in the illustrated areas on the axes of awakening degree and pleasant degree.

For example, in the example indicated by (T) in FIG. 14, the users #1 and #2 have strong favorable emotions toward each other. Specifically, as indicated by (U) in FIG. 14, both the emotion of the user #1 upon watching the user #2 and the emotion of the user #2 upon watching the user #1 are the "super-positive state," and both the awakening degree and the pleasant degree are larger than a predetermined threshold value. In this case, the social network server 40 checks the schedules of the respective users #1 and #2 and retrieves the most recent date on which the schedules of both users are vacant. Moreover, as indicated by (V) in FIG. 14, the social network server 40 displays a message "This person may love you," the information on the other user, and the retrieved date "A:B (month:day)," for example, on the respective head mount devices 10 and 60.

Although the social network server 40 may display a recommendation only, the social network server 40 may display a date request button for requesting a date on the retrieved date as a candidate date on the respective head mount devices 10 and 60 together with the information illustrated in (V) of FIG. 14. Moreover, for example, when the user #1 presses the date request button, the social network server 40 may display a message such as "A request for a date was received from the user #1" on the head mount device 10 of the user #2. When the user #2 accepts the request, the social network server 40 may automatically register an event that a date is scheduled on the retrieved date on the schedules of the users #1 and #2.

Moreover, as indicated by (W) in FIG. 14, when the fact that the users #1 and #2 are lovers is registered and the emotions of the users #1 and #2 are negative, the social network server 40 may display a negative suggestion "How about breaking up?" on the head mount device 10. Specifically, the emotion of the user #2 toward the user #1 is the "super-negative state" as indicated by (X) in FIG. 14, and the emotion of the user #1 toward the user #2 is the "super-negative state" or the "negative state" as indicated by (Y) in FIG. 14. In this case, the social network server 40 may display a negative suggestion "How about breaking up with user #2?" on the head mount device 60 of the user #1 as indicated by (Z) in FIG. 14.

8-2. Relation Between Emotion Determining Server and Social Network Server

In the above-described embodiment, the information providing system 1 that includes the emotion determining server 30 that determines the emotions of users and the social network server 40 that determines a target of the emotion of the user and determines whether or not to provide the information on the other user depending on the emotions of the respective users as individual servers has been described. However, the embodiment is not limited to this. That is, the function provided by the emotion determining server 30 and the function provided by the social network server 40 may be realized by one information processing device.

Further, in the above-described embodiment, the emotion determining server 30 specifies the emotions of users and the social network server 40 specifies the target of the emotion possessed by the user using the face authentication technique. However, the embodiment is not limited to this. For example, the emotion determining server 30 includes a facial image database 45 illustrated in FIG. 6 and the specifying unit 47 and receives the subject images, the line of sight information, and the emotional scores from the head mount devices 10 and 60. Moreover, the emotion determining server 30 may specify the emotions of users and the other user serving as the target of the emotion of the user using the received subject images, line of sight information, and emotional scores.

8-3. Social Network Server

In the example described above, the social network server 40 provides the information on the first user to the second user when the emotion of the first user toward the second user is the "super-positive state" and the emotion of the second user toward the first user is the "positive state." However, the embodiment is not limited to this.

For example, the social network server 40 may provide the information on the first user to the second user only when the emotion of the first user toward the second user is the "excited state" and the emotion of the second user toward the first user is the "relaxed state." That is, the social network server 40 may use optional conditions if whether or not to provide the information on the first user to the second user is determined based on the emotions of the respective users.

Moreover, if it is determined that the information on the first user is to be provided to the second user, the social network server 40 makes a suggestion by asking the second user if he (she) wants to become a friend with the first user. However, the embodiment is not limited to this. For example, the social network server 40 may only update the social graphs of the respective users managed by the social network server 40 without making any suggestion. Moreover, if it is determined that the information on the first user is to be provided to the second user, the social network server 40 may provide the profile of the first user to the second user, for example.

Moreover, the social network server 40 may display a message "Mr/Ms. XX may be a good match for you," for example, an emotional degree obtained by digitizing the emotion of the first user toward the second user, the fact that the first user is a candidate lover, the fact that the first user is a candidate friend, and another optional notification on the head mount device worn by the second user. Further, for example, when both the emotion of the first user and the emotion of the second user are the "excited state," the social network server 40 may display the fact that the other users are candidate lovers on the head mount devices worn by the first and second users.

Moreover, the social network server 40 may provide the information on the respective users at an optional timing. Further, the social network server 40 may provide the information on the other user on terminal devices possessed by the users, for example, rather than on the head mount devices 10 and 60 in a push email form or a message form.

The process in which the social network server 40 determines the target of the emotion is not limited to the above-described process. For example, when a subject image is shared, the user may add the identification information of a person included in the subject image. Thus, the social network server 40 specifies a person whom the user watches from the subject image and the line of sight information and specifies the specified person using the identification information added by the user. After that, upon acquiring the emotion that the emotion determining server determines using the emotional score acquired simultaneously with the subject image, the social network server 40 may determine that the acquired emotion is an emotion toward the specified person.

Further, the social network server 40 may control transmission of messages and sharing of data according to the user's emotion. For example, the social network server 40 has a function of sharing data such as a sentence or a picture posted by a user with other users. Moreover, when the user 41 requests sharing of the data posted by the user #2, the social network server 40 determines whether the emotion of the user #2 toward the user #1 is the "angry state."

When the emotion of the user #2 toward the user #1 is the "angry state," the social network server 40 limits sharing of the data such as the sentence or the picture posted by the user #2 by transmitting a message that it is unable to share data to the user #1, for example. In this manner, the social network server 40 may limit sharing of data posted by the user depending on the user's emotion.

Further, the social network server 40 may control the range of information sharing according to the emotions of users who are already registered as friends. For example, when the user #1 has the emotion "super-negative state" toward the user #2, the social network server 40 may allow sharing basic information only such as the profile of the user #1 with the user #2 and may limit sharing of posting data such as a recent status. That is, the social network server 40 can limit sharing of data posted by the respective users according to an optional rule depending on the mutual emotions of the respective users.

8-4. Process of Specifying Target of Emotion

The social network server 40 specifies the user serving as the target of an emotion using the subject image and the line of sight information. However, the embodiment is not limited to this. For example, the social network server 40 may specify the emotions toward the respective users using subject images in which a plurality of users is included and an average value of the emotional scores of the users when the respective subject images are captured.

For example, the social network server 40 acquires a plurality of images captured by the first user. Moreover, the social network server 40 identifies other users included in the respective images using a user setting, a face authentication technique, or the like. Further, the social network server 40 acquires the emotional score of the first user when the respective images are captured.

The social network server 40 executes the following process for each of the users included in the image. First, the social network server 40 specifies an image in which a certain user is included. Subsequently, the social network server 40 calculates an average value of the emotional scores of the first user when the specified image is captured. Moreover, the social network server 40 specifies the emotion of the first user toward the user using calculated average value. By executing such a process, the social network server 40 can specify the emotion of the first user toward the other users from the image captured by the first user and including a plurality of users.

8-5. Head Mount Device

In the above-described example, upon receiving the suggestion notification from the social network server 40, the head mount devices 10 and 60 display a notification content included in the received suggestion notification. However, the embodiment is not limited to this. For example, the head mount device 10 may display the notification content when the line of sight of the user wearing the head mount device 10 is identical to the line of sight of the user indicated by the notification target information included in the suggestion notification.

The function provided by the head mount devices 10 and 60 may be realized using a combination of an emotional score acquiring device that acquires the emotional scores from users and a terminal device such as a smartphone that communicates with a network. For example, the terminal device used by the first user may transmit the emotional score that the emotional score acquiring device acquired from the first user and the image captured by the operation of the first user to the social network server 40.

In this case, the social network server 40 specifies an image in which each of the users is included and calculates an average value of the emotional scores of the first user when the specified respective images are captured. Moreover, the social network server 40 transmits the calculated average value of the emotional scores to the emotion determining server 30 and specifies the emotion of the first user toward the other user. The social network server 40 specifies all emotions of the respective users toward the other users by executing the process with respect to the respective users. Moreover, the social network server 40 determines whether or not to provide the information on the other users to the respective users depending on the specified emotion.

After that, if it is determined that the information on the second user is to be provided to the first user, for example, the social network server 40 transmits the information on the second user to the terminal device used by the first user via an email or a message. In this manner, the information providing system 1 can substitute the function provided by the head mount devices 10 and 60 with the combination of the emotional score acquiring device that acquires the emotional scores from users and the terminal device such as a smartphone that communicates with the network.

8-6. Biological Information

The head mount device 10 acquires biosensor values from users and calculates the emotional scores using the acquired biosensor values. Moreover, the emotion determining server 30 specifies the emotions of the users using the emotional scores calculated by the head mount device 10. However, the embodiment is not limited to this. For example, the head mount device 10 transmits the biosensor values acquired from the users to the emotion determining server 30 as they were. Moreover, the emotion determining server 30 may calculate emotional scores from the biosensor values received from the head mount device 10 and specify the emotions of the users using the calculated emotional scores. Further, the emotion determining server 30 may determine the emotions of the users using the biosensor values as they are such as a heart rate or an FDA value, for example, rather than specifying the emotions of the users from the emotional scores.

That is, in the above-described embodiment, the emotion determining server 30 may determine the emotions of users using biological information including optional information of the users such as biosensor values or emotional scores. In the following description, optional information of the users such as biosensor values or emotional scores will be described as biological information.

8-7. Notification Content

The information providing system 1 notifies the first user of the information on the second user who has an affection for the first user. However, the embodiment is not limited to this.

For example, the information providing system 1 may notify the first user of the fact that there is a user who has an affection for the first user and may leave the second user anonymous. Further, the information providing system 1 may introduce the second user by notifying the first user of information such as a profile of the second user who has an affection for the first user.

8-8. Others

The functions of the emotion determining server 30 and the social network server 40 may be realized by a plurality of server devices using a so-called cloud function. For example, the functions provided by the receiving unit 35, the determining unit 36, and the notifying unit 37 included in the emotion determining server 30 may be realized by different server devices. Moreover, the functions provided by the receiving unit 46, the specifying unit 47, the updating unit 48, the determining unit 49, and the transmitting unit 50 included in the social network server 40 may be realized by different server devices.

Further, the entirety or part of the process described as being performed automatically among the processes described in the above embodiment may be performed manually, or the entirety or part of the process described as being performed manually may be performed automatically according to an existing method. Besides this, a processing sequence, specific names, and information including various types of data and parameters illustrated in this specification and the drawings can be changed optionally unless otherwise specified. For example, various types of information illustrated in the drawings are not limited to the illustrated information. Further, for example, the user interface (UI) of the application illustrated in the respective drawings is not limited to this.

Further, the constituent components of the illustrated respective devices are functional and conceptual constituent components and are not necessarily physically configured as illustrated in the drawings. That is, the specific forms of distribution and integration of the respective devices are not limited to those illustrated in the drawings, and all or part of the devices can be functionally or physically distributed and integrated in an optional unit depending on various loads, use conditions, and the like. Further, the functions provided by the respective constituent components may be provided when a central processing unit (CPU) executes a predetermined determination program.

9. Effects

As described above, the emotion determining server 30 according to the embodiment specifies the emotion of the first user toward the second user and the emotion of the second user toward the first user using the biological information of the first and second users. Moreover, the social network server 40 determines whether or not to provide the information on the second user to the first user based on the specified respective emotions. Thus, the social network server 40 can provide the information on the second user to the first user without making the respective users feel unpleasant.

Moreover, the social network server 40 determines that the information on the second user is to be provided to the first user when the respective emotions meet predetermined conditions. Thus, for example, when the respective users do not feel unpleasant such as when the second user has an affection for the first user and the first user has a favorable emotion toward the second user, the social network server 40 can provide the information on the second user to the first user.

Moreover, the social network server 40 determines that the information on the second user is not to be provided to the first user when the emotion of the first user toward the second user is the "negative state" or the "super-negative state." Thus, the social network server 40 can prevent the respective users from feeling unpleasant.

Further, the social network server 40 determines that the information on the second user is to be provided to the first user when the emotion of the first user toward the second user is not the "negative state" or the "super-negative state" and the emotion of the second user toward the first user is the "super-positive state." That is, the social network server 40 provides the information on the second user to the first user when the second user has a favorable emotion toward the first user and the first user does not have a negative emotion toward the second user. Therefore, the social network server 40 can prevent the second user from feeling unpleasant.

Further, the social network server 40 provides the information on the second user to the first user and provides the information on the first user to the second user when both the emotion of the first user toward the second user and the emotion of the second user toward the first user are the "super-positive state." Therefore, the social network server 40 can provide the information on the respective users to the other users when both the first and second users have a favorable emotion.

Further, the social network server 40 determines the target of the emotion using the subject image and the line of sight direction acquired by the head mount device 10. Moreover, the social network server 40 determines that the emotion specified by the emotion determining server 30 is the emotion toward the determined target. Therefore, the social network server 40 can determine the user serving as the target of the emotions possessed by the respective users.

Moreover, the social network server 40 transmits a notification for displaying the information on the second user within the sight of the first user to the head mount device 10 if it is determined that the information on the second user is to be provided to the first user. Therefore, the social network server 40 allows the first user to easily recognize the second user who has an affection for the first user.

Further, the social network server 40 transmits information for introducing the second user to the head mount device 10 used by the first user if it is determined that the information on the second user is to be provided to the first user. Therefore, the social network server 40 allows the second user having an affection for the first user to be introduced to the first user.

10. Program

Figure 15:
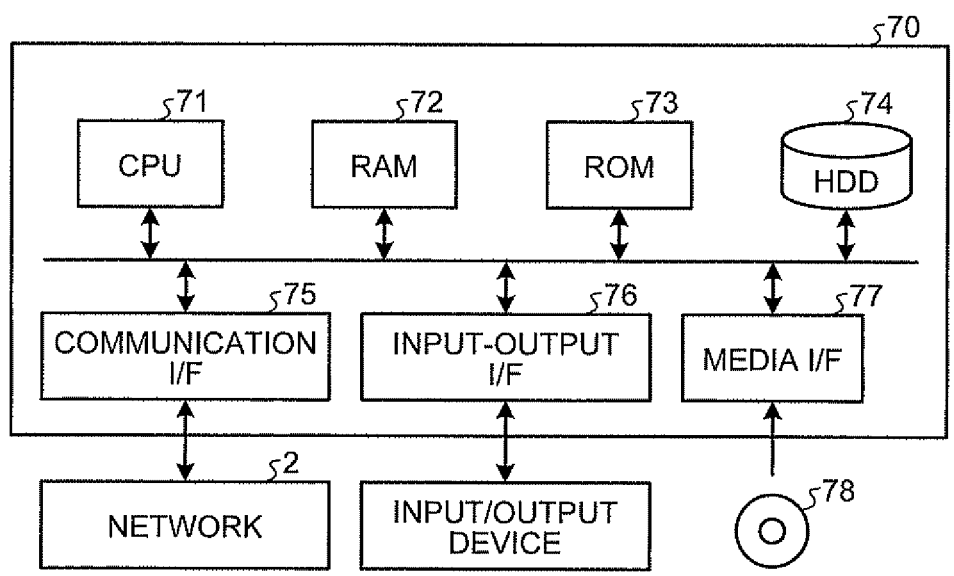
FIG. 15 is a diagram illustrating an example of a hardware configuration of a computer that executes a determination program.

In the above-described embodiment, the social network server 40 is realized when a computer 70 having such a configuration as illustrated in FIG. 15, for example, executes a determination program. FIG. 15 is a diagram illustrating an example of a hardware configuration of the computer that executes the determination program. The computer 70 includes a central processing unit (CPU) 71, a random access memory (RAM) 72, a read only memory (ROM) 73, a hard disk drive (HDD) 74, a communication interface (I/F) 75, an input-output interface (I/F) 76, and a media interface (I/F) 77.

The CPU 71 operates based on a program stored in the ROM 73 or the HOD 74 and controls the respective units. The ROM 73 stores a boot program executed by the CPU 71 during start of the computer 70 and a program or the like dependent on the hardware of the computer 70.

The HDD 74 stores a determination program executed by the CPU 71 and data and the like used by the determination program. For example, the HDD 74 stores the same data as the emotional information management table 44 and the like described in FIG. 6. The communication interface 75 receives data from another device via the network 2 to deliver the data to the CPU 71 and transmits data generated by the CPU 71 to the other device via the network 2.

The CPU 71 controls an output device such as a display or a printer and an input device such as a keyboard or a mouse with the aid of the input-output interface 76. The CPU 71 acquires data from the input device via the input-output interface 76. Moreover, the CPU 71 outputs the generated data to the output device via the input-output interface 76.

The media interface 77 reads the determination program or the data stored in a recording medium 78 and provides the read program or data to the CPU 71 via the RAM 72. The CPU 71 loads the program from the recording medium 78 onto the RAM 72 via the media interface 77 and executes the loaded program. The recording medium 78 is a recording medium on which the determination program according to the present application is recorded, and for example, is an optical recording medium such as a digital versatile disc (DVD) or a phase-change rewritable disk (PD), a magneto-optical recording medium such as a magneto-optical disk (MO), a tape medium, a magnetic recording medium, or a semiconductor memory, for example.

When the computer 70 functions as the social network server 40 according to the above-described embodiment, the CPU 71 of the computer 70 realizes the functions of the receiving unit 46, the specifying unit 47, the updating unit 48, the determining unit 49, and the transmitting unit 50 by executing the program loaded on the RAM 72.

Although the CPU 71 of the computer 70 reads the determination program from the recording medium 78 and executes the program, as another example, the program may be acquired from another device via the network 2.

According to an aspect of the embodiment, it is possible to provide the information on users without making the users feel unpleasant.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising:
    a plurality of collecting units collecting biological information of a first user and a second user, wherein the plurality of collecting units include: (i) a biosensor for acquiring one or more biosensor data from a user, and wherein the biosensor data is analyzed for determining an emotion of the user or (ii) a camera for retrieving image data associated with a user, and wherein the image data is analyzed for determining an emotion of the user;
    a specifying unit specifying an emotion of the first user toward the second user and an emotion of the second user toward the first user using the collected biological information; and
    a determining unit determining whether or not to provide information on the second user to the first user based on the specified emotions of both of the first user and the second user, and wherein the determining unit determining the information on the second user is not to be provided to the first user if the emotion of the first user toward the second user is specified as being a negative emotion.

2. The information processing according to claim 1,
    the determining unit determining determining the information on the second user is to be provided to the first user if the specified respective emotions meet predetermined conditions.

3. The information processing system according to claim 2, further
    the determining unit determining the information on the second user is to be provided to the first user if the emotion of the first user toward the second user is specified as not being a negative emotion and the emotion of the second user toward the first user is specified as being a favorable emotion.

4. The information processing system according to claim 2, further
    the determining unit determining the information on the second user is to be provided to the first user and information on the first user is to be provided to the second user if both the emotion of the first user toward the second user and the emotion of the second user toward the first user are specified as being favorable emotions.

5. The information processing system according to claim 1, further
    one of the plurality of the collecting units collects biological information of the first user or the second user, a subject image which is a scene that the first user or the second user watches, and a line of sight direction of the first user or the second from a biological information acquisition device that can be worn by the first user or the second user, and additional determining unit determining a target of the emotion of the first user or the second user from the subject image and the line of sight direction collected from the biological information acquisition device and specifies the emotion of the first user or the second user toward the target using the biological information collected from the biological information acquisition device.

6. The information processing system according to claim 1, further comprising:
    an output unit outputting a notification for displaying the information on the second user so as to be overlapped with an image of the second user to a display device that displays optional information within a sight of the first user if the determining unit determines that the information on the second user is to be provided to the first user.

7. The information processing system according to claim 1, further comprising:
    an output unit outputting information for introducing the second user to a terminal device used by the first user if the determining unit determines that the information on the second user is to be provided to the first user.

8. A determination method performed by an information processing system, the determination method comprising:
    collecting biological information of a first user and a second user, wherein collecting the biological information includes: (i) acquiring, via a biosensor, one or more biosensor data from a user, and wherein the biosensor data is analyzed for determining an emotion of the user or (ii) retrieving, via a camera, image data associated with a user, and wherein the image data is analyzed for determining an emotion of the user;
    specifying an emotion of the first user toward the second user and an emotion of the second user toward the first user based on the collected biological information; and
    determining whether or not to provide information on the second user to the first user based on the specified emotions, and wherein determining includes determining the information on the second user is not to be provided to the first user if the emotion of the first user toward the second user is specified as being a negative emotion.

9. The determination method according to claim 8, wherein
the determining includes determining that the information on the second user is to be provided to the first user if the specified emotions meet predetermined conditions.

10. The determination method according to claim 9, wherein
the determining includes determining that the information on the second user is to be provided to the first user if the emotion of the first user toward the second user is not a negative emotion and the emotion of the second user toward the first user is specified as bring a favorable emotion.

11. The determination method according to claim 9, wherein
the determining includes determining that the information on the second user is to be provided to the first user and the information on the first user is to be provided to the second user if both the emotion of the first user toward the second user and the emotion of the second user toward the first user are specified as being favorable emotions.

12. The determination method according to claim 8, wherein
the collecting includes collecting biological information of the first user or the second, a subject image which is a scene that the first user or the second watches, and a line of sight direction of the first user or the second from a biological information acquisition device that can be worn by the first user or the second, and
the specifying includes determining a target of the emotion of the first user or the second from the subject image and the line of sight direction collected from the biological information acquisition device and specifying the emotion of the first user or the second toward the target using the biological information collected at the collecting from the biological information acquisition device.

13. A non-transitory computer readable storage medium having stored therein a determination program, the determination program causing a plurality of processors to execute a process, the process comprising:
collecting biological information of a first user and a second user, wherein collecting the biological information includes: (i) acquiring one or more biosensor data from a user, and wherein the biosensor data is analyzed for determining an emotion of the user or (ii) retrieving image data associated with a user, and wherein the image data is analyzed for determining an emotion of the user;
specifying an emotion of the first user toward the second user and an emotion of the second user toward the first user using the collected biological information; and
determining whether or not to provide information on the second user to the first user based on the respective emotions specified at the specifying, and wherein the determining includes determining that the information on the second user is not to be provided to the first user if the emotion of the first user toward the second user is specified as being a negative emotion.

14. The non-transitory computer readable storage medium according to claim 13, wherein
the determining includes determining that the information on the second user is to be provided to the first user if the specified respective emotions meet predetermined conditions.

15. The non-transitory computer readable storage medium according to claim 14, wherein
the determining includes determining that the information on the second user is to be provided to the first user if the emotion of the first user toward the second user is specified not being a negative emotion and the emotion of the second user toward the first user is specified as being a favorable emotion.

16. The non-transitory computer readable storage medium according to claim 14, wherein
the determining includes determining that the information on the second user is to be provided to the first user and the information on the first user is to be provided to the second user if both the emotion of the first user toward the second user and the emotion of the second user toward the first user are specified as being favorable emotions.

17. The non-transitory computer readable storage medium according to claim 13, wherein
the collecting includes collecting biological information of the first user or the second, a subject image which is a scene that the first user or the second watches, and a line of sight direction of the first user or the second from a biological information acquisition device that can be worn by the first user or the second, and
the specifying includes determining a target of the emotion of the first user or the second from the subject image and the line of sight direction collected from the biological information acquisition device and specifying the emotion of the first user or the second toward the target using the biological information collected at the collecting from the biological information acquisition device.

* * * * *